(12) United States Patent
Dutta et al.

(10) Patent No.: US 11,595,474 B2
(45) Date of Patent: Feb. 28, 2023

(54) ACCELERATING DATA REPLICATION USING MULTICAST AND NON-VOLATILE MEMORY ENABLED NODES

(71) Applicant: Cisco Technology, Inc., San Jose, CA (US)

(72) Inventors: Debojyoti Dutta, Santa Clara, CA (US); Amit Kumar Saha, Bangalore (IN); Johnu George, San Jose, CA (US); Ramdoot Kumar Pydipaty, Bangalore (IN); Marc Solanas Tarre, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1037 days.

(21) Appl. No.: 15/856,716

(22) Filed: Dec. 28, 2017

(65) Prior Publication Data

US 2019/0208011 A1 Jul. 4, 2019

(51) Int. Cl.
*G06F 7/00* (2006.01)
*H04L 67/1095* (2022.01)
(Continued)

(52) U.S. Cl.
CPC .......... *H04L 67/1095* (2013.01); *G06F 3/065* (2013.01); *G06F 3/0683* (2013.01); *G06F 11/1464* (2013.01); *G06F 16/22* (2019.01)

(58) Field of Classification Search
CPC ... H04L 67/1095; G06F 16/22; G06F 16/184; G06F 3/065; G06F 3/0683; G06F 11/1464
(Continued)

(56) References Cited

U.S. PATENT DOCUMENTS

| 5,812,773 A | 9/1998 | Norin |
| 5,889,896 A | 3/1999 | Meshinsky et al. |

(Continued)

FOREIGN PATENT DOCUMENTS

| CN | 101719930 | 6/2010 |
| CN | 101394360 | 7/2011 |

(Continued)

OTHER PUBLICATIONS

Amedro, Brian, et al., "An Efficient Framework for Running Applications on Clusters, Grids and Cloud," 2010, 17 pages.
(Continued)

*Primary Examiner* — Md I Uddin
(74) *Attorney, Agent, or Firm* — Polsinelli

(57) ABSTRACT

A method for accelerating data operations across a plurality of nodes of one or more clusters of a distributed computing environment. Rack awareness information characterizing the plurality of nodes is retrieved and a non-volatile memory (NVM) capability of each node is determined. A write operation is received at a management node of the plurality of nodes and one or more of the rack awareness information and the NVM capability of the plurality of nodes are analyzed to select one or more nodes to receive at least a portion of the write operation, wherein at least one of the selected nodes has an NVM capability. A multicast group for the write operation is then generated wherein the selected nodes are subscribers of the multicast group, and the multicast group is used to perform hardware accelerated read or write operations at one or more of the selected nodes.

17 Claims, 6 Drawing Sheets

(51) Int. Cl.
  *G06F 11/14* (2006.01)
  *G06F 3/06* (2006.01)
  *G06F 16/22* (2019.01)
(58) Field of Classification Search
  USPC .................................... 707/615, 616, 660
  See application file for complete search history.

(56) References Cited

U.S. PATENT DOCUMENTS

| | | | |
|---|---|---|---|
| 6,108,782 A | 8/2000 | Fletcher et al. | |
| 6,178,453 B1 | 1/2001 | Mattaway et al. | |
| 6,298,153 B1 | 10/2001 | Oishi | |
| 6,343,290 B1 | 1/2002 | Cossins et al. | |
| 6,643,260 B1 | 11/2003 | Kloth et al. | |
| 6,683,873 B1 | 1/2004 | Kwok et al. | |
| 6,721,804 B1 | 4/2004 | Rubin et al. | |
| 6,733,449 B1 | 5/2004 | Krishnamurthy et al. | |
| 6,735,631 B1 | 5/2004 | Oehrke et al. | |
| 6,996,615 B1 | 2/2006 | McGuire | |
| 7,054,930 B1 | 5/2006 | Cheriton | |
| 7,058,706 B1 | 6/2006 | Lyer et al. | |
| 7,062,571 B1 | 6/2006 | Dale et al. | |
| 7,111,177 B1 | 9/2006 | Chauvel et al. | |
| 7,212,490 B1 | 5/2007 | Kao et al. | |
| 7,277,948 B2 | 10/2007 | Igarashi et al. | |
| 7,313,667 B1 | 12/2007 | Pullela et al. | |
| 7,379,846 B1 | 5/2008 | Williams et al. | |
| 7,480,672 B2 | 1/2009 | Hahn et al. | |
| 7,496,043 B1 | 2/2009 | Leong et al. | |
| 7,536,476 B1 | 5/2009 | Alleyne | |
| 7,567,504 B2 | 7/2009 | Darling et al. | |
| 7,583,665 B1 | 9/2009 | Duncan et al. | |
| 7,606,147 B2 | 10/2009 | Luft et al. | |
| 7,644,437 B2 | 1/2010 | Volpano | |
| 7,647,594 B2 | 1/2010 | Togawa | |
| 7,773,510 B2 | 8/2010 | Back et al. | |
| 7,808,897 B1 | 10/2010 | Mehta et al. | |
| 7,881,957 B1 | 2/2011 | Cohen et al. | |
| 7,917,647 B2 | 3/2011 | Cooper et al. | |
| 8,010,598 B2 | 8/2011 | Tanimoto | |
| 8,028,071 B1 | 9/2011 | Mahalingam et al. | |
| 8,041,714 B2 | 10/2011 | Aymeloglu et al. | |
| 8,121,117 B1 | 2/2012 | Amdahl et al. | |
| 8,171,415 B2 | 5/2012 | Appleyard et al. | |
| 8,234,377 B2 | 7/2012 | Cohn | |
| 8,244,559 B2 | 8/2012 | Horvitz et al. | |
| 8,250,215 B2 | 8/2012 | Stienhans et al. | |
| 8,280,880 B1 | 10/2012 | Aymeloglu et al. | |
| 8,284,664 B1 | 10/2012 | Aybay et al. | |
| 8,301,746 B2 | 10/2012 | Head et al. | |
| 8,345,692 B2 | 1/2013 | Smith | |
| 8,406,141 B1 | 3/2013 | Couturier et al. | |
| 8,407,413 B1 | 3/2013 | Yucel et al. | |
| 8,448,171 B2 | 5/2013 | Donnellan et al. | |
| 8,477,610 B2 | 7/2013 | Zuo et al. | |
| 8,495,356 B2 | 7/2013 | Ashok et al. | |
| 8,495,725 B2 | 7/2013 | Ahn | |
| 8,510,469 B2 | 8/2013 | Portolani | |
| 8,514,868 B2 | 8/2013 | Hill | |
| 8,532,108 B2 | 9/2013 | Li et al. | |
| 8,533,687 B1 | 9/2013 | Greifeneder et al. | |
| 8,547,974 B1 | 10/2013 | Guruswamy et al. | |
| 8,560,639 B2 | 10/2013 | Murphy et al. | |
| 8,560,663 B2 | 10/2013 | Baucke et al. | |
| 8,589,543 B2 | 11/2013 | Dutta et al. | |
| 8,590,050 B2 | 11/2013 | Nagpal et al. | |
| 8,611,356 B2 | 12/2013 | Yu et al. | |
| 8,612,625 B2 | 12/2013 | Andreis et al. | |
| 8,630,291 B2 | 1/2014 | Shaffer et al. | |
| 8,639,787 B2 | 1/2014 | Lagergren et al. | |
| 8,656,024 B2 | 2/2014 | Krishnan et al. | |
| 8,660,129 B1 | 2/2014 | Brendel et al. | |
| 8,719,804 B2 | 5/2014 | Jain | |
| 8,775,576 B2 | 7/2014 | Hebert et al. | |
| 8,797,867 B1 | 8/2014 | Chen et al. | |
| 8,805,951 B1 | 8/2014 | Faibish et al. | |
| 8,850,002 B1 | 9/2014 | Dickinson et al. | |
| 8,850,182 B1 | 9/2014 | Fritz et al. | |
| 8,856,339 B2 | 10/2014 | Mestery et al. | |
| 8,909,928 B2 | 12/2014 | Ahmad et al. | |
| 8,918,510 B2 | 12/2014 | Gmach et al. | |
| 8,924,720 B2 | 12/2014 | Raghuram et al. | |
| 8,930,747 B2 | 1/2015 | Levijarvi et al. | |
| 8,938,775 B1 | 1/2015 | Roth et al. | |
| 8,959,526 B2 | 2/2015 | Kansal et al. | |
| 8,977,754 B2 | 3/2015 | Curry, Jr. et al. | |
| 9,009,697 B2 | 4/2015 | Breiter et al. | |
| 9,015,324 B2 | 4/2015 | Jackson | |
| 9,043,439 B2 | 5/2015 | Bicket et al. | |
| 9,049,115 B2 | 6/2015 | Rajendran et al. | |
| 9,063,789 B2 | 6/2015 | Beaty et al. | |
| 9,065,727 B1 | 6/2015 | Liu et al. | |
| 9,075,649 B1 | 7/2015 | Bushman et al. | |
| 9,130,846 B1 | 9/2015 | Szabo et al. | |
| 9,164,795 B1 | 10/2015 | Vincent | |
| 9,167,050 B2 | 10/2015 | Durazzo et al. | |
| 9,201,701 B2 | 12/2015 | Boldyrev et al. | |
| 9,201,704 B2 | 12/2015 | Chang et al. | |
| 9,203,784 B2 | 12/2015 | Chang et al. | |
| 9,223,634 B2 | 12/2015 | Chang et al. | |
| 9,244,776 B2 | 1/2016 | Koza et al. | |
| 9,251,114 B1 | 2/2016 | Ancin et al. | |
| 9,264,478 B2 | 2/2016 | Hon et al. | |
| 9,294,408 B1 | 3/2016 | Dickinson et al. | |
| 9,313,048 B2 | 4/2016 | Chang et al. | |
| 9,361,192 B2 | 6/2016 | Smith et al. | |
| 9,379,982 B1 | 6/2016 | Krishna et al. | |
| 9,380,075 B2 | 6/2016 | He et al. | |
| 9,432,245 B1 | 8/2016 | Sorenson, III et al. | |
| 9,432,294 B1 | 8/2016 | Sharma et al. | |
| 9,444,744 B1 | 9/2016 | Sharma et al. | |
| 9,473,365 B2 | 10/2016 | Melander et al. | |
| 9,503,530 B1 | 11/2016 | Niedzielski | |
| 9,558,078 B2 | 1/2017 | Farlee et al. | |
| 9,571,570 B1 | 2/2017 | Mutnuru | |
| 9,613,078 B2 | 4/2017 | Vermeulen et al. | |
| 9,628,471 B1 | 4/2017 | Sundaram et al. | |
| 9,658,876 B2 | 5/2017 | Chang et al. | |
| 9,692,802 B2 | 6/2017 | Bicket et al. | |
| 9,755,858 B2 | 9/2017 | Bagepalli et al. | |
| 2001/0055303 A1 | 12/2001 | Horton et al. | |
| 2002/0073337 A1 | 6/2002 | Ioele et al. | |
| 2002/0143928 A1 | 10/2002 | Maltz et al. | |
| 2002/0166117 A1 | 11/2002 | Abrams et al. | |
| 2002/0174216 A1 | 11/2002 | Shorey et al. | |
| 2003/0018591 A1 | 1/2003 | Komisky | |
| 2003/0056001 A1 | 3/2003 | Mate et al. | |
| 2003/0228585 A1 | 12/2003 | Inoko et al. | |
| 2004/0004941 A1 | 1/2004 | Malan et al. | |
| 2004/0034702 A1 | 2/2004 | He | |
| 2004/0088542 A1 | 5/2004 | Daude et al. | |
| 2004/0095237 A1 | 5/2004 | Chen et al. | |
| 2004/0131059 A1 | 7/2004 | Ayyakad et al. | |
| 2004/0197079 A1 | 10/2004 | Latvala et al. | |
| 2004/0264481 A1 | 12/2004 | Darling et al. | |
| 2005/0060418 A1 | 3/2005 | Sorokopud | |
| 2005/0125424 A1 | 6/2005 | Herriott et al. | |
| 2006/0062187 A1 | 3/2006 | Rune | |
| 2006/0104286 A1 | 5/2006 | Cheriton | |
| 2006/0126665 A1 | 6/2006 | Ward et al. | |
| 2006/0146825 A1 | 7/2006 | Hofstaedter et al. | |
| 2006/0155875 A1 | 7/2006 | Cheriton | |
| 2006/0168338 A1 | 7/2006 | Bruegl et al. | |
| 2006/0233106 A1 | 10/2006 | Achlioptas et al. | |
| 2007/0174663 A1 | 7/2007 | Crawford et al. | |
| 2007/0223487 A1 | 9/2007 | Kajekar et al. | |
| 2007/0242830 A1 | 10/2007 | Conrado et al. | |
| 2008/0005293 A1 | 1/2008 | Bhargava et al. | |
| 2008/0080524 A1 | 4/2008 | Tsushima et al. | |
| 2008/0084880 A1 | 4/2008 | Dharwadkar | |
| 2008/0165778 A1 | 7/2008 | Ertemalp | |
| 2008/0198752 A1 | 8/2008 | Fan et al. | |
| 2008/0198858 A1 | 8/2008 | Townsley et al. | |
| 2008/0201711 A1 | 8/2008 | Amir Husain | |

(56) References Cited

U.S. PATENT DOCUMENTS

| | | |
|---|---|---|
| 2008/0235755 A1 | 9/2008 | Blaisdell et al. |
| 2009/0006527 A1 | 1/2009 | Gingell, Jr. et al. |
| 2009/0019367 A1 | 1/2009 | Cavagnari et al. |
| 2009/0031312 A1 | 1/2009 | Mausolf et al. |
| 2009/0083183 A1 | 3/2009 | Rao et al. |
| 2009/0138763 A1 | 5/2009 | Arnold |
| 2009/0177775 A1 | 7/2009 | Radia et al. |
| 2009/0178058 A1 | 7/2009 | Stillwell, III et al. |
| 2009/0182874 A1 | 7/2009 | Morford et al. |
| 2009/0265468 A1 | 10/2009 | Annambhotla et al. |
| 2009/0265753 A1 | 10/2009 | Anderson et al. |
| 2009/0293056 A1 | 11/2009 | Ferris |
| 2009/0300608 A1 | 12/2009 | Ferris et al. |
| 2009/0313562 A1 | 12/2009 | Appleyard et al. |
| 2009/0323706 A1 | 12/2009 | Germain et al. |
| 2009/0328031 A1 | 12/2009 | Pouyadou et al. |
| 2010/0036903 A1 | 2/2010 | Ahmad et al. |
| 2010/0042720 A1 | 2/2010 | Stienhans et al. |
| 2010/0061250 A1 | 3/2010 | Nugent |
| 2010/0115341 A1 | 5/2010 | Baker et al. |
| 2010/0131765 A1 | 5/2010 | Bromley et al. |
| 2010/0149966 A1 | 6/2010 | Achlioptas et al. |
| 2010/0191783 A1 | 7/2010 | Mason et al. |
| 2010/0192157 A1 | 7/2010 | Jackson et al. |
| 2010/0205601 A1 | 8/2010 | Abbas et al. |
| 2010/0211782 A1 | 8/2010 | Auradkar et al. |
| 2010/0293270 A1 | 11/2010 | Augenstein et al. |
| 2010/0318609 A1 | 12/2010 | Lahiri et al. |
| 2010/0325199 A1 | 12/2010 | Park et al. |
| 2010/0325441 A1 | 12/2010 | Laurie et al. |
| 2010/0333116 A1 | 12/2010 | Prahlad et al. |
| 2011/0016214 A1 | 1/2011 | Jackson |
| 2011/0035754 A1 | 2/2011 | Srinivasan |
| 2011/0055396 A1 | 3/2011 | Dehaan |
| 2011/0055398 A1 | 3/2011 | Dehaan et al. |
| 2011/0055470 A1 | 3/2011 | Portolani |
| 2011/0072489 A1 | 3/2011 | Parann-Nissany |
| 2011/0075667 A1 | 3/2011 | Li et al. |
| 2011/0110382 A1 | 5/2011 | Jabr et al. |
| 2011/0116443 A1 | 5/2011 | Yu et al. |
| 2011/0126099 A1 | 5/2011 | Anderson et al. |
| 2011/0138055 A1 | 6/2011 | Daly et al. |
| 2011/0145413 A1 | 6/2011 | Dawson et al. |
| 2011/0145657 A1 | 6/2011 | Bishop et al. |
| 2011/0173303 A1 | 7/2011 | Rider |
| 2011/0185063 A1 | 7/2011 | Head et al. |
| 2011/0185065 A1 | 7/2011 | Stanisic et al. |
| 2011/0206052 A1 | 8/2011 | Tan et al. |
| 2011/0213966 A1 | 9/2011 | Fu et al. |
| 2011/0219434 A1 | 9/2011 | Betz et al. |
| 2011/0231715 A1 | 9/2011 | Kunii et al. |
| 2011/0231899 A1 | 9/2011 | Pulier et al. |
| 2011/0239039 A1 | 9/2011 | Dieffenbach et al. |
| 2011/0252327 A1 | 10/2011 | Awasthi et al. |
| 2011/0261811 A1 | 10/2011 | Battestilli et al. |
| 2011/0261828 A1 | 10/2011 | Smith |
| 2011/0276675 A1 | 11/2011 | Singh et al. |
| 2011/0276951 A1 | 11/2011 | Jain |
| 2011/0283013 A1 | 11/2011 | Grosser et al. |
| 2011/0295998 A1 | 12/2011 | Ferris et al. |
| 2011/0305149 A1 | 12/2011 | Scott et al. |
| 2011/0307531 A1 | 12/2011 | Gaponenko et al. |
| 2011/0320870 A1 | 12/2011 | Kenigsberg et al. |
| 2012/0005724 A1 | 1/2012 | Lee |
| 2012/0036234 A1 | 2/2012 | Staats et al. |
| 2012/0054367 A1 | 3/2012 | Ramakrishnan et al. |
| 2012/0072318 A1 | 3/2012 | Akiyama et al. |
| 2012/0072578 A1 | 3/2012 | Alam |
| 2012/0072581 A1 | 3/2012 | Tung et al. |
| 2012/0072985 A1 | 3/2012 | Davne et al. |
| 2012/0072992 A1 | 3/2012 | Arasaratnam et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0102193 A1 | 4/2012 | Rathore et al. |
| 2012/0102199 A1 | 4/2012 | Hopmann et al. |
| 2012/0131174 A1 | 5/2012 | Ferris et al. |
| 2012/0137215 A1 | 5/2012 | Kawara |
| 2012/0158967 A1 | 6/2012 | Sedayao et al. |
| 2012/0159097 A1 | 6/2012 | Jennas, II et al. |
| 2012/0167094 A1 | 6/2012 | Suit |
| 2012/0173710 A1 | 7/2012 | Rodriguez |
| 2012/0179909 A1 | 7/2012 | Sagi et al. |
| 2012/0180044 A1 | 7/2012 | Donnellan et al. |
| 2012/0182891 A1 | 7/2012 | Lee et al. |
| 2012/0185913 A1 | 7/2012 | Martinez et al. |
| 2012/0192016 A1 | 7/2012 | Gotesdyner et al. |
| 2012/0192075 A1 | 7/2012 | Ebtekar et al. |
| 2012/0201135 A1 | 8/2012 | Ding et al. |
| 2012/0214506 A1 | 8/2012 | Skaaksrud et al. |
| 2012/0222106 A1 | 8/2012 | Kuehl |
| 2012/0236716 A1 | 9/2012 | Anbazhagan et al. |
| 2012/0240113 A1 | 9/2012 | Hur |
| 2012/0265976 A1 | 10/2012 | Spiers et al. |
| 2012/0272025 A1 | 10/2012 | Park et al. |
| 2012/0281706 A1 | 11/2012 | Agarwal et al. |
| 2012/0281708 A1 | 11/2012 | Chauhan et al. |
| 2012/0290647 A1 | 11/2012 | Ellison et al. |
| 2012/0297238 A1 | 11/2012 | Watson et al. |
| 2012/0311106 A1 | 12/2012 | Morgan |
| 2012/0311568 A1 | 12/2012 | Jansen |
| 2012/0324092 A1 | 12/2012 | Brown et al. |
| 2012/0324114 A1 | 12/2012 | Dutta et al. |
| 2013/0003567 A1 | 1/2013 | Gallant et al. |
| 2013/0013248 A1 | 1/2013 | Brugler et al. |
| 2013/0036213 A1 | 2/2013 | Hasan et al. |
| 2013/0044636 A1 | 2/2013 | Koponen et al. |
| 2013/0060884 A1* | 3/2013 | Bernbo ............... G06F 16/184 709/216 |
| 2013/0066940 A1 | 3/2013 | Shao |
| 2013/0080509 A1 | 3/2013 | Wang |
| 2013/0080624 A1 | 3/2013 | Nagai et al. |
| 2013/0091557 A1 | 4/2013 | Gurrapu |
| 2013/0097601 A1 | 4/2013 | Podvratnik et al. |
| 2013/0104140 A1 | 4/2013 | Meng et al. |
| 2013/0111540 A1 | 5/2013 | Sabin |
| 2013/0117337 A1 | 5/2013 | Dunham |
| 2013/0124712 A1 | 5/2013 | Parker |
| 2013/0125124 A1 | 5/2013 | Kempf et al. |
| 2013/0138816 A1 | 5/2013 | Kuo et al. |
| 2013/0144978 A1 | 6/2013 | Jain et al. |
| 2013/0152076 A1 | 6/2013 | Patel |
| 2013/0152175 A1 | 6/2013 | Hromoko et al. |
| 2013/0159097 A1 | 6/2013 | Schory et al. |
| 2013/0159496 A1 | 6/2013 | Hamilton et al. |
| 2013/0160008 A1 | 6/2013 | Cawlfield et al. |
| 2013/0162753 A1 | 6/2013 | Hendrickson et al. |
| 2013/0169666 A1 | 7/2013 | Pacheco et al. |
| 2013/0179941 A1 | 7/2013 | McGloin et al. |
| 2013/0182712 A1 | 7/2013 | Aguayo et al. |
| 2013/0185433 A1 | 7/2013 | Zhu et al. |
| 2013/0191106 A1 | 7/2013 | Kephart et al. |
| 2013/0198374 A1 | 8/2013 | Zalmanovitch et al. |
| 2013/0201989 A1 | 8/2013 | Hu et al. |
| 2013/0204849 A1 | 8/2013 | Chacko |
| 2013/0232491 A1 | 9/2013 | Radhakrishnan et al. |
| 2013/0246588 A1 | 9/2013 | Borowicz et al. |
| 2013/0250770 A1 | 9/2013 | Zou et al. |
| 2013/0254415 A1 | 9/2013 | Fullen et al. |
| 2013/0262347 A1 | 10/2013 | Dodson |
| 2013/0283364 A1 | 10/2013 | Chang et al. |
| 2013/0297769 A1 | 11/2013 | Chang et al. |
| 2013/0318240 A1 | 11/2013 | Hebert et al. |
| 2013/0318546 A1 | 11/2013 | Kothuri et al. |
| 2013/0339949 A1 | 12/2013 | Spiers et al. |
| 2014/0006481 A1 | 1/2014 | Frey et al. |
| 2014/0006535 A1 | 1/2014 | Reddy |
| 2014/0006585 A1 | 1/2014 | Dunbar et al. |
| 2014/0040473 A1 | 2/2014 | Ho et al. |
| 2014/0040883 A1 | 2/2014 | Tompkins |
| 2014/0052877 A1 | 2/2014 | Mao |
| 2014/0056146 A1 | 2/2014 | Hu et al. |
| 2014/0059310 A1 | 2/2014 | Du et al. |
| 2014/0074850 A1 | 3/2014 | Noel et al. |

(56) References Cited

U.S. PATENT DOCUMENTS

| | | |
|---|---|---|
| 2014/0075048 A1 | 3/2014 | Yuksel et al. |
| 2014/0075108 A1 | 3/2014 | Dong et al. |
| 2014/0075357 A1 | 3/2014 | Flores et al. |
| 2014/0075501 A1 | 3/2014 | Srinivasan et al. |
| 2014/0089727 A1 | 3/2014 | Cherkasova et al. |
| 2014/0098762 A1 | 4/2014 | Ghai et al. |
| 2014/0108985 A1 | 4/2014 | Scott et al. |
| 2014/0122560 A1 | 5/2014 | Ramey et al. |
| 2014/0136779 A1 | 5/2014 | Guha et al. |
| 2014/0140211 A1 | 5/2014 | Chandrasekaran et al. |
| 2014/0141720 A1 | 5/2014 | Princen et al. |
| 2014/0156557 A1 | 6/2014 | Zeng et al. |
| 2014/0164486 A1 | 6/2014 | Ravichandran et al. |
| 2014/0188825 A1 | 7/2014 | Muthukkaruppan et al. |
| 2014/0189095 A1 | 7/2014 | Lindberg et al. |
| 2014/0189125 A1 | 7/2014 | Amies et al. |
| 2014/0215471 A1 | 7/2014 | Cherkasova |
| 2014/0222953 A1 | 8/2014 | Karve et al. |
| 2014/0244851 A1 | 8/2014 | Lee |
| 2014/0245298 A1 | 8/2014 | Zhou et al. |
| 2014/0281173 A1 | 9/2014 | Im et al. |
| 2014/0282536 A1 | 9/2014 | Dave et al. |
| 2014/0282611 A1 | 9/2014 | Campbell et al. |
| 2014/0282889 A1 | 9/2014 | Ishaya et al. |
| 2014/0289200 A1 | 9/2014 | Kato |
| 2014/0295831 A1 | 10/2014 | Karra et al. |
| 2014/0297569 A1 | 10/2014 | Clark et al. |
| 2014/0297835 A1 | 10/2014 | Buys |
| 2014/0310391 A1 | 10/2014 | Sorensen, III et al. |
| 2014/0310417 A1 | 10/2014 | Sorensen, III et al. |
| 2014/0310418 A1 | 10/2014 | Sorensen, III et al. |
| 2014/0314078 A1 | 10/2014 | Jilani |
| 2014/0317261 A1 | 10/2014 | Shatzkamer et al. |
| 2014/0321278 A1 | 10/2014 | Cafarelli et al. |
| 2014/0330976 A1 | 11/2014 | van Bemmel |
| 2014/0330977 A1 | 11/2014 | van Bemmel |
| 2014/0334488 A1 | 11/2014 | Guichard et al. |
| 2014/0337557 A1* | 11/2014 | Nowoczynski ......... G06F 3/064 710/308 |
| 2014/0362682 A1 | 12/2014 | Guichard et al. |
| 2014/0365680 A1 | 12/2014 | van Bemmel |
| 2014/0366155 A1 | 12/2014 | Chang et al. |
| 2014/0369204 A1 | 12/2014 | Anand et al. |
| 2014/0372567 A1 | 12/2014 | Ganesh et al. |
| 2014/0379938 A1 | 12/2014 | Bosch et al. |
| 2015/0033086 A1 | 1/2015 | Sasturkar et al. |
| 2015/0043576 A1 | 2/2015 | Dixon et al. |
| 2015/0052247 A1 | 2/2015 | Threefoot et al. |
| 2015/0052517 A1 | 2/2015 | Raghu et al. |
| 2015/0058382 A1 | 2/2015 | St. Laurent et al. |
| 2015/0058459 A1 | 2/2015 | Amendjian et al. |
| 2015/0071285 A1 | 3/2015 | Kumar et al. |
| 2015/0085870 A1 | 3/2015 | Narasimha et al. |
| 2015/0089082 A1 | 3/2015 | Patwardhan et al. |
| 2015/0100471 A1 | 4/2015 | Curry, Jr. et al. |
| 2015/0103827 A1 | 4/2015 | Quinn et al. |
| 2015/0106802 A1 | 4/2015 | Ivanov et al. |
| 2015/0106805 A1 | 4/2015 | Melander et al. |
| 2015/0117199 A1 | 4/2015 | Chinnaiah Sankaran et al. |
| 2015/0117458 A1 | 4/2015 | Gurkan et al. |
| 2015/0120914 A1 | 4/2015 | Wada et al. |
| 2015/0124622 A1 | 5/2015 | Kovvali et al. |
| 2015/0138973 A1 | 5/2015 | Kumar et al. |
| 2015/0178133 A1 | 6/2015 | Phelan et al. |
| 2015/0189009 A1 | 7/2015 | van Bemmel |
| 2015/0215819 A1 | 7/2015 | Bosch et al. |
| 2015/0227405 A1 | 8/2015 | Jan et al. |
| 2015/0234674 A1* | 8/2015 | Zhong ................ G06F 9/45558 718/1 |
| 2015/0242204 A1 | 8/2015 | Hassine et al. |
| 2015/0249709 A1 | 9/2015 | Teng et al. |
| 2015/0263901 A1 | 9/2015 | Kumar et al. |
| 2015/0280980 A1 | 10/2015 | Bitar |
| 2015/0281067 A1 | 10/2015 | Wu |
| 2015/0281113 A1 | 10/2015 | Siciliano et al. |
| 2015/0309908 A1 | 10/2015 | Pearson et al. |
| 2015/0319063 A1 | 11/2015 | Zourzouvillys et al. |
| 2015/0326524 A1 | 11/2015 | Tankala et al. |
| 2015/0339210 A1 | 11/2015 | Kopp et al. |
| 2015/0358850 A1 | 12/2015 | La Roche, Jr. et al. |
| 2015/0365324 A1 | 12/2015 | Kumar et al. |
| 2015/0373108 A1 | 12/2015 | Fleming et al. |
| 2016/0011925 A1 | 1/2016 | Kulkarni et al. |
| 2016/0013990 A1 | 1/2016 | Kulkarni et al. |
| 2016/0026684 A1 | 1/2016 | Mukherjee et al. |
| 2016/0062786 A1 | 3/2016 | Meng et al. |
| 2016/0094389 A1 | 3/2016 | Jain et al. |
| 2016/0094398 A1 | 3/2016 | Choudhury et al. |
| 2016/0094453 A1 | 3/2016 | Jain et al. |
| 2016/0094454 A1 | 3/2016 | Jain et al. |
| 2016/0094455 A1 | 3/2016 | Jain et al. |
| 2016/0094456 A1 | 3/2016 | Jain et al. |
| 2016/0094480 A1 | 3/2016 | Kulkarni et al. |
| 2016/0094643 A1 | 3/2016 | Jain et al. |
| 2016/0099847 A1 | 4/2016 | Melander et al. |
| 2016/0099853 A1 | 4/2016 | Nedeltchev et al. |
| 2016/0099864 A1 | 4/2016 | Akiya et al. |
| 2016/0105393 A1 | 4/2016 | Thakkar et al. |
| 2016/0127184 A1 | 5/2016 | Bursell |
| 2016/0134557 A1 | 5/2016 | Steinder et al. |
| 2016/0156708 A1 | 6/2016 | Jalan et al. |
| 2016/0164780 A1 | 6/2016 | Timmons et al. |
| 2016/0164914 A1 | 6/2016 | Madhav et al. |
| 2016/0182378 A1 | 6/2016 | Basavaraja et al. |
| 2016/0188527 A1 | 6/2016 | Cherian et al. |
| 2016/0217104 A1* | 7/2016 | Kamble ................ G06F 3/0632 |
| 2016/0234071 A1 | 8/2016 | Nambiar et al. |
| 2016/0239399 A1 | 8/2016 | Babu et al. |
| 2016/0253078 A1 | 9/2016 | Ebtekar et al. |
| 2016/0254968 A1 | 9/2016 | Ebtekar et al. |
| 2016/0261564 A1 | 9/2016 | Foxhoven et al. |
| 2016/0277368 A1 | 9/2016 | Narayanaswamy et al. |
| 2016/0350146 A1* | 12/2016 | Udupi ................... G06F 9/5027 |
| 2017/0005948 A1 | 1/2017 | Melander et al. |
| 2017/0024260 A1 | 1/2017 | Chandrasekaran et al. |
| 2017/0026294 A1 | 1/2017 | Basavaraja et al. |
| 2017/0026470 A1 | 1/2017 | Bhargava et al. |
| 2017/0041342 A1 | 2/2017 | Efremov et al. |
| 2017/0054659 A1 | 2/2017 | Ergin et al. |
| 2017/0097841 A1 | 4/2017 | Chang et al. |
| 2017/0099188 A1 | 4/2017 | Chang et al. |
| 2017/0104755 A1 | 4/2017 | Arregoces et al. |
| 2017/0147297 A1 | 5/2017 | Krishnamurthy et al. |
| 2017/0149878 A1 | 5/2017 | Mutnuru |
| 2017/0163531 A1 | 6/2017 | Kumar et al. |
| 2017/0171158 A1 | 6/2017 | Hoy et al. |
| 2017/0264663 A1 | 9/2017 | Bicket et al. |
| 2017/0339070 A1 | 11/2017 | Chang et al. |
| 2018/0091586 A1* | 3/2018 | Auradkar ............ H04L 67/1095 |

FOREIGN PATENT DOCUMENTS

| | | |
|---|---|---|
| CN | 102164091 | 8/2011 |
| CN | 104320342 | 1/2015 |
| CN | 105740084 | 7/2016 |
| EP | 2228719 | 9/2010 |
| EP | 2439637 | 4/2012 |
| EP | 2645253 | 11/2014 |
| JP | 2017011432 A * | 6/2015 |
| KR | 10-2015-0070676 | 5/2015 |
| TW | M394537 | 12/2010 |
| WO | WO 2009/155574 | 12/2009 |
| WO | WO 2010/030915 | 3/2010 |
| WO | WO 2013/158707 | 10/2013 |

OTHER PUBLICATIONS

Author Unknown, "5 Benefits of a Storage Gateway in the Cloud," Blog, TwinStrata, Inc., Jul. 25, 2012, XP055141645, 4 pages, https://web.archive.org/web/20120725092619/http://blog.twinstrata.com/2012/07/10//5-benefits-of-a-storage-gateway-in-the-cloud.

(56) References Cited

OTHER PUBLICATIONS

Author Unknown, "Joint Cisco and VMWare Solution for Optimizing Virtual Desktop Delivery: Data Center 3.0: Solutions to Accelerate Data Center Virtualization," Cisco Systems, Inc. and VMware, Inc., Sep. 2008, 10 pages.
Author Unknown, "A Look at DeltaCloud: The Multi-Cloud API," Feb. 17, 2012, 4 pages.
Author Unknown, "About Deltacloud," Apache Software Foundation, Aug. 18, 2013, 1 page.
Author Unknown, "Architecture for Managing Clouds, A White Paper from the Open Cloud Standards Incubator," Version 1.0.0, Document No. DSP-IS0102, Jun. 18, 2010, 57 pages.
Author Unknown, "Cloud Infrastructure Management Interface—Common Information Model (CIMI-CIM)," Document No. DSP0264, Version 1.0.0, Dec. 14, 2012, 21 pages.
Author Unknown, "Cloud Infrastructure Management Interface (CIMI) Primer," Document No. DSP2027, Version 1.0.1, Sep. 12, 2012, 30 pages.
Author Unknown, "cloudControl Documentation," Aug. 25, 2013, 14 pages.
Author Unknown, "Interoperable Clouds, A White Paper from the Open Cloud Standards Incubator," Version 1.0.0, Document No. DSP-IS0101, Nov. 11, 2009, 21 pages.
Author Unknown, "Microsoft Cloud Edge Gateway (MCE) Series Appliance," Iron Networks, Inc., 2014, 4 pages.
Author Unknown, "Open Data Center Alliance Usage: Virtual Machine (VM) Interoperability in a Hybrid Cloud Environment Rev. 1.2," Open Data Center Alliance, Inc., 2013, 18 pages.
Author Unknown, "Real-Time Performance Monitoring On Juniper Networks Devices, Tips and Tools for Assessing and Analyzing Network Efficiency," Juniper Networks, Inc., May 2010, 35 pages.
Author Unknown, "Use Cases and Interactions for Managing Clouds, A White Paper from the Open Cloud Standards Incubator," Version 1.0.0, Document No. DSP-IS00103, Jun. 16, 2010, 75 pages.
Author Unknown, "Apache Ambari Meetup What's New," Hortonworks Inc., Sep. 2013, 28 pages.
Author Unknown, "Introduction," Apache Ambari project, Apache Software Foundation, 2014, 1 page.
Baker, F., "Requirements for IP Version 4 Routers," Jun. 1995, 175 pages, Network Working Group, Cisco Systems.
Beyer, Steffen, "Module "Data::Locations?!"," YAPC::Europe, London, UK,ICA, Sep. 22-24, 2000, XP002742700, 15 pages.
Blanchet, M., "A Flexible Method for Managing the Assignment of Bits of an IPv6 Address Block," Apr. 2003, 8 pages, Network Working Group, Viagnie.
Borovick, Lucinda, et al., "Architecting the Network for the Cloud," IDC White Paper, Jan. 2011, 8 pages.
Bosch, Greg, "Virtualization," last modified Apr. 2012 by B. Davison, 33 pages.
Broadcasters Audience Research Board, "What's Next," http://lwww.barb.co.uk/whats-next, accessed Jul. 22, 2015, 2 pages.
Cisco Systems, Inc. "Best Practices in Deploying Cisco Nexus 1000V Series Switches on Cisco UCS B and C Series Cisco UCS Manager Servers," Cisco White Paper, Apr. 2011, 36 pages, http://www.cisco.com/en/US/prod/collateral/switches/ps9441/ps9902/white_paper_c11-558242.pdf.
Cisco Systems, Inc., "Cisco Unified Network Services: Overcame Obstacles to Cloud-Ready Deployments," Cisco White Paper, Jan. 2011, 6 pages.
Cisco Systems, Inc., "Cisco Intercloud Fabric: Hybrid Cloud with Choice, Consistency, Control and Compliance," Dec. 10, 2014, 22 pages.
Cisco Technology, Inc., "Cisco Expands Videoscape TV Platform Into the Cloud," Jan. 6, 2014, Las Vegas, Nevada, Press Release, 3 pages.
Citrix, "Citrix StoreFront 2.0" White Paper, Proof of Concept Implementation Guide, Citrix Systems, Inc., 2013, 48 pages.
Citrix, "CloudBridge for Microsoft Azure Deployment Guide," 30 pages.
Citrix, "Deployment Practices and Guidelines for NetScaler 10.5 on Amazon Web Services," White Paper, citrix.com, 2014, 14 pages.
CSS Corp, "Enterprise Cloud Gateway (ECG)—Policy driven framework for managing multi-cloud environments," original published on or about Feb. 11, 2012; 1 page; http://www.css-cloud.com/platform/enterprise-cloud-gateway.php.
Fang K., "LISP MAC-EID-TO-RLOC Mapping (LISP based L2VPN)," Network Working Group, Internet Draft, CISCO Systems, Jan. 2012, 12 pages.
Ford, Bryan, et al., Peer-to-Peer Communication Across Network Address Translators, In USENIX Annual Technical Conference, 2005, pp. 179-192.
Gedymin, Adam, "Cloud Computing with an emphasis on Google App Engine," Sep. 2011, 146 pages.
Good, Nathan A., "Use Apache Deltacloud to administer multiple instances with a single API," Dec. 17, 2012, 7 pages.
Herry, William, "Keep It Simple, Stupid: OpenStack nova-scheduler and its algorithm", May 12, 2012, IBM, 12 pages.
Hewlett-Packard Company, "Virtual context management on network devices", Research Disclosure, vol. 564, No. 60, Apr. 1, 2011, Mason Publications, Hampshire, GB, Apr. 1, 2011, 524.
Juniper Networks, Inc., "Recreating Real Application Traffic in Junosphere Lab," Solution Brief, Dec. 2011, 3 pages.
Kenhui, "Musings On Cloud Computing and IT-as-a-Service: [Updated for Havana] Openstack Computer for VSphere Admins, Part 2: Nova-Scheduler and DRS", Jun. 26, 2013, Cloud Architect Musings, 12 pages.
Kolyshkin, Kirill, "Virtualization in Linux," Sep. 1, 2006, XP055141648, 5 pages, https://web.archive.org/web/20070120205111/http://download.openvz.org/doc/openvz-intro.pdf.
Kumar, S., et al., "Infrastructure Service Forwarding For NSH,"Service Function Chaining Internet Draft, draft-kumar-sfc-nsh-forwarding-00, Dec. 5, 2015, 10 pages.
Kunz, Thomas, et al., "OmniCloud—The Secure and Flexible Use of Cloud Storage Services," 2014, 30 pages.
Lerach, S.R.O., "Golem," http://www.lerach.cz/en/products/golem, accessed Jul. 22, 2015, 2 pages.
Linthicum, David, "VM Import could be a game changer for hybrid clouds", InfoWorld, Dec. 23, 2010, 4 pages.
Logan, Marcus, "Hybrid Cloud Application Architecture for Elastic Java-Based Web Applications," F5 Deployment Guide Version 1.1, 2016, 65 pages.
Lynch, Sean, "Monitoring cache with Claspin" Facebook Engineering, Sep. 19, 2012, 5 pages.
Meireles, Fernando Miguel Dias, "Integrated Management of Cloud Computing Resources," 2013-2014, 286 pages.
Meraki, "meraki releases industry's first cloud-managed routers," Jan. 13, 2011, 2 pages.
Mu, Shuai, et al., "uLibCloud: Providing High Available and Uniform Accessing to Multiple Cloud Storages," 2012 IEEE, 8 pages.
Naik, Vijay K., et al., "Harmony: A Desktop Grid for Delivering Enterprise Computations," Grid Computing, 2003, Fourth International Workshop on Proceedings, Nov. 17, 2003, pp. 1-11.
Nair, Srijith K. et al., "Towards Secure Cloud Bursting, Brokerage and Aggregation," 2012, 8 pages, www.flexiant.com.
Nielsen, "SimMetry Audience Measurement—Technology," http://www.nielsen-atmosphere.eu/products-and-services-simmetry-audience-measurement-technology/, accessed Jul. 22, 2015, 6 pages.
Nielsen, "Television," http://www.nielsen.com/us/en/solutions/measurement/television.html, accessed Jul. 22, 2015, 4 pages.
Open Stack, "Filter Scheduler," updated Dec. 17, 2017, 5 pages, accessed on Dec. 18, 2017, https://docs.openstack.org/nova/latest/user/filter-scheduler.html.
Quinn, P., et al., "Network Service Header," Internet Engineering Task Force Draft, Jul. 3, 2014, 27 pages.
Quinn, P., et al., "Service Function Chaining (SFC) Architecture," Network Working Group, Internet Draft, draft-quinn-sfc-arch-03.txt, Jan. 22, 2014, 21 pages.
Rabadan, J., et al., "Operational Aspects of Proxy-ARP/ND in EVPN Networks," BESS Workgroup Internet Draft, draft-snr-bess-evpn-proxy-arp-nd-02, Oct. 6, 2015, 22 pages.

(56) References Cited

OTHER PUBLICATIONS

Saidi, Ali, et al., "Performance Validation of Network-Intensive Workloads on a Full-System Simulator," Interaction between Operating System and Computer Architecture Workshop, (IOSCA 2005), Austin, Texas, Oct. 2005, 10 pages.

Shunra, "Shunra for HP Software; Enabling Confidence in Application Performance Before Deployment," 2010, 2 pages.

Son, Jungmin, "Automatic decision system for efficient resource selection and allocation in inter-clouds," Jun. 2013, 35 pages.

Sun, Aobing, et al., "IaaS Public Cloud Computing Platform Scheduling Model and Optimization Analysis," Int. J. Communications, Network and System Sciences, 2011, 4, 803-811, 9 pages.

Szymaniak, Michal, et al., "Latency-Driven Replica Placement", vol. 47 No. 8, IPSJ Journal, Aug. 2006, 12 pages.

Toews, Everett, "Introduction to Apache jclouds," Apr. 7, 2014, 23 pages.

Von Laszewski, Gregor, et al., "Design of a Dynamic Provisioning System for a Federated Cloud and Bare-metal Environment," 2012, 8 pages.

Wikipedia, "Filter (software)", Wikipedia, Feb. 8, 2014, 2 pages, https://en.wikipedia.org/w/index.php?title=Filter_%28software%29&oldid=594544359.

Wikipedia; "Pipeline (Unix)", Wikipedia, May 4, 2014, 4 pages, https://en.wikipedia.org/w/index.php?title=Pipeline2/028Unix%29&oldid=606980114.

Ye, Xianglong, et al., "A Novel Blocks Placement Strategy for Hadoop," 2012 IEEE/ACTS 11th International Conference on Computer and Information Science, 2012 IEEE, 5 pages.

\* cited by examiner

US 11,595,474 B2

ACCELERATING DATA REPLICATION USING MULTICAST AND NON-VOLATILE MEMORY ENABLED NODES

TECHNICAL FIELD

The present technology relates in general to distributed computing systems, and more particularly to accelerating replication and other read/write operations.

BACKGROUND

Distributed computing systems and environments have quickly gained popularity in both commercial and individual applications, due at least in part to their ability to efficiently scale and handle the massive data streams that are often associated with big data computing problems. As analytical techniques have become increasingly advanced and the pricing for commodity hardware has become more accessible, big data computing applications have flourished and a number of platforms and frameworks have been developed in order to support such big data computing endeavors.

Apache Hadoop is an open-source framework that is commonly utilized to handle distributed storage needs in big data computing. Under the Hadoop framework, commodity hardware is organized into compute clusters, each containing a plurality of nodes, which are designed to be highly fault tolerant. Storage in Hadoop is governed by the Hadoop Distributed File System (HDFS), which operates by splitting a received file into blocks and distributing these blocks across various nodes in a cluster. This distribution pattern enables local parallel processing of the dataset, which is generally more efficient than attempting to process the dataset using a conventional architecture. However, HDFS replication processes are often taken over a random selection of nodes and are driven by software, leading to throughput and latency issues. Accordingly, improvements are needed.

Apache Kafka is an open-source stream processing platform that is commonly utilized to handle processing of real-time data feeds or other streaming data sets. A Kafka cluster is organized to receive messages from one or more producers and to distribute messages to one or more consumers. Kafka organizes messages received from producers into one or more topics, with each topic being partitioned into one or more partitions. These partitions can then be distributed across the physical nodes of the Kafka cluster, similar to the manner in which HDFS distributes blocks across the physical nodes of an HDFS cluster. However, Kafka itself provides functionality akin to a memory buffer, and does not guarantee that a message transmitted to a physical node of the Kafka cluster has in fact been persisted to disk. Furthermore, when performing cluster mirroring operations, Kafka can experience latency and buffer issues due to the tight coupling required between source and destination Kafka clusters or between producers and consumers. Accordingly, improvements are needed.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only examples of the disclosure and are not therefore to be considered to be limiting of its scope, the principles herein are described and explained with additional specificity and detail through the use of the accompanying drawings in which.

DESCRIPTION OF EXAMPLE EMBODIMENTS

Overview

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

The present technology includes systems, methods, and computer-readable media for accelerating replication and other read/write operations in computing systems, and distributed computing systems in particular. Rack information is analyzed and extended to include awareness of non-volatile memory (NVM) capabilities of one or more nodes of the computing systems, and using this NVM awareness the associated NVM-capable nodes can be prioritized in various manners in order to improve computational efficiency and overall system performance. In addition to the NVM capability, it is contemplated that multicast groups can be generated corresponding to the NVM-capable nodes and specific read and write operations, such that data operations can be hardware accelerated rather than managed in software. These and other advantages are made clear in view of the following description.

DETAILED DESCRIPTION

Figure 1:
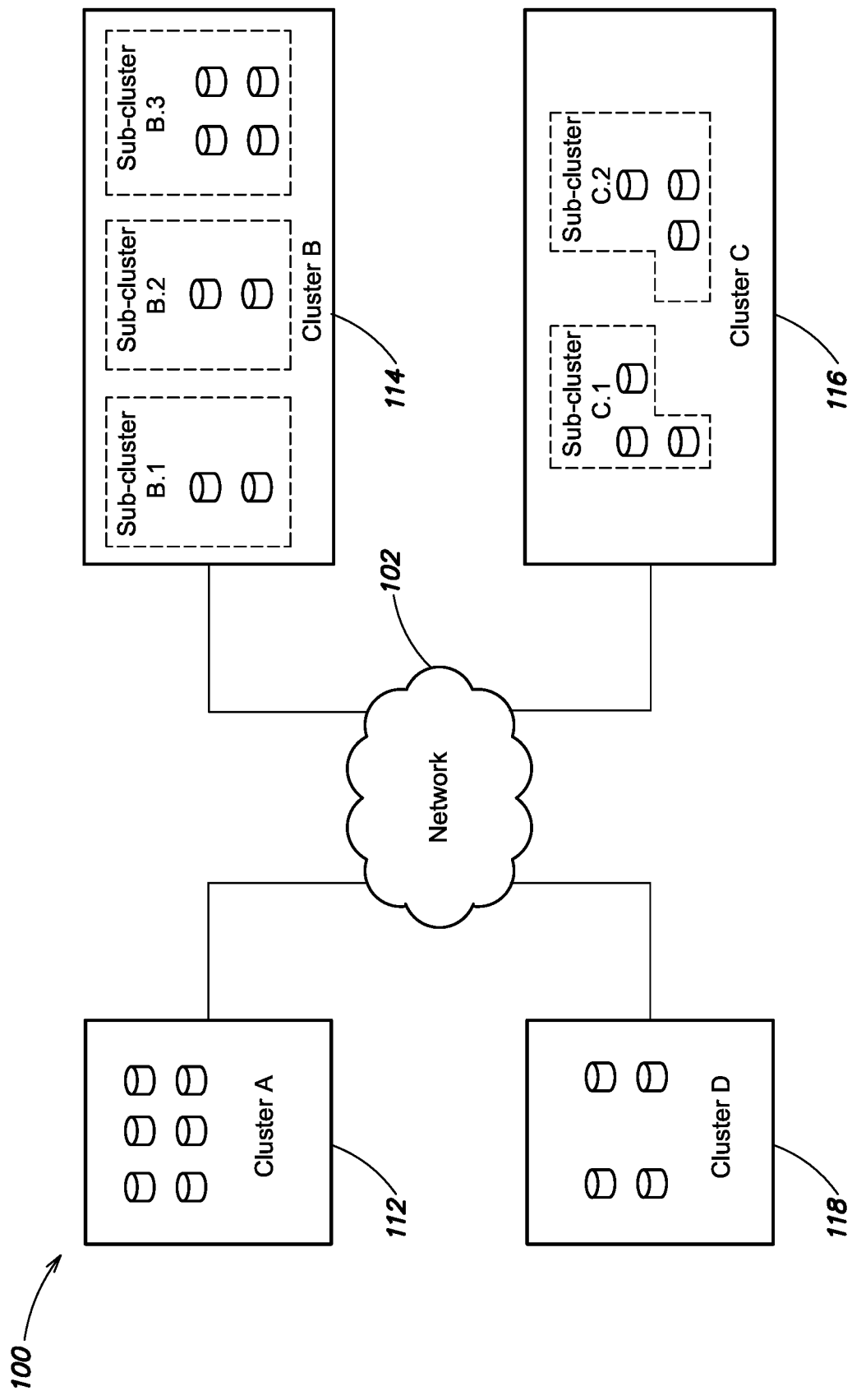
FIG. 1 depicts an example environment in which aspects of the present disclosure may operate.

FIG. 1 illustrates an example network environment 100 in which the present disclosure may operate. Environment 100 includes a plurality of computing clusters 112, 114, 116, and 118 (labeled as Cluster A, Cluster B, Cluster C, and Cluster D, respectively) although it is appreciated that a greater or lesser number of computing clusters can be provided. The computing clusters are illustrated here as coupled to a network 102, which can be, for example, the Internet, an intranet, or other public and private networks known in the art. Additionally, the communicative couplings between one or more of the plurality of computing clusters 112, 114, 116, 118 and network 102 can be provided via wired connections, wireless connections, or some combination of the two. In some embodiments, one or more of the computing clusters 112, 115, 116, 118 can be co-located—that is, provided in essentially the same geographic location, such as in a single data center. One or more of the computing clusters may be remotely located relative to other computing clusters, for example, in a configuration wherein the computing clusters are provided across two or more different data centers.

As illustrated, each of the computing clusters 112, 114, 116, 118 comprise a series of computing nodes, which may be provided as discrete hardware units (e.g. a single node corresponds to a single server), may be provided in a serverless configuration (e.g. a single node corresponds to a distributed assortment of pooled hardware components), or some combination of the two. In some embodiments, one or more of the computing clusters 112, 114, 116, 118 may be provided via Cisco Unified Computing System (UCS) data centers or server products, although the instant disclosure is not limited to UCS data centers and server products. While in some embodiments it is possible that each computing node is the same, or at least substantially identical, it may also be the case that the constituent computing nodes of the computing clusters differ on one or more factors such as a number of processors, a speed of the processors, a type of memory (e.g. RAM or non-volatile memory (NVM)), available memory, available disk storage, available computational capacity or current workload, network bandwidth and latency, power consumption, age, and other such factors that would be appreciated by a person of ordinary skill in the art.

The various computing Clusters A, B, C, and D illustrate various exemplary manners in which computing cluster configurations can differ, although these depictions are not intended to be limiting. Computing cluster A is depicted as comprising six computing nodes organized into a single cluster; computing cluster B is depicted as comprising eight computing nodes organized into a sub-cluster B.1 of two nodes, a sub-cluster B.2 of two nodes, and a sub-cluster B.3 of four nodes; computing cluster C is depicted as comprising six computing nodes organized into a sub-cluster C.1 of three nodes and a sub-cluster C.2 of three nodes; and computing cluster D is depicted as comprising four computing nodes organized into a single cluster. In some embodiments, clusters A, B, C, and D might be provided as discrete data centers containing computing nodes for providing one or more distributed computing systems, although it is also possible that the distinction between one or more of clusters A, B, C, and D is logical rather than physical. For example, the six computing nodes of cluster A might be configured as Kafka clusters, the two computing nodes of sub-cluster B.1 might each be configured as Kafka clusters, the two computing nodes of sub-cluster B.2 might each be configured as HDFS NameNodes, and the four computing nodes of sub-cluster B.3 might each be configured as HDFS DataNodes. The arrangement of nodes within any one of the Clusters A, B, C, and D can be fixed or dynamic. For example, a fixed arrangement might hard-wire the relationships defining the constituent computing nodes of sub-clusters B.1, B.2, and B.3 whereas a dynamic arrangement might assign various nodes and sub-clusters in real-time in order to account for current demand, computational needs, or other factors. In the following disclosure, where reference is made to various computing clusters, it is understood that such reference is intended to include both singular cluster entities such as clusters A, B, C, and D, as well as sub-cluster entities such as sub-clusters B.1, B.2, B.3, C.1, and C.2. The clusters, sub-clusters, and constituent nodes that are discussed herein can be configured with a variety of different software platforms, frameworks, and systems. Although particular reference will be made to the Apache Kafka stream processing platform and the Apache Hadoop distributed storage and processing framework, aspects of the present disclosure are not limited to solely these two implementations.

Turning first to computing clusters implementing the Apache Kafka stream processing platform, the disclosure begins with a discussion of the issue of replication in Kafka. Two primary types of replication are discussed below: replication between nodes of a single Kafka cluster and replication across Kafka clusters. In either type of replication, it is contemplated that a given Kafka cluster can be provided via nodes of a single data center or provided via nodes of multiple data centers without departing from the scope of the present disclosure. With this in mind, the discussion turns now to FIG. 2, which depicts a diagram 200 illustrating an exemplary replication process of the present disclosure as applied to replication between nodes of a single Kafka cluster.

For purposes of clarity, diagram 200 depicts a simplified architecture consisting of a plurality of producers 202, a Kafka cluster 210, and a management service 206. In some embodiments, management service 206 can be provided by the Apache ZooKeeper project for distributed configuration, synchronization, and management. As such, 'ZooKeeper' and 'management service' are used interchangeably herein, although this is not indicative of any limitation such that the management service 206 can only be provided by Apache ZooKeeper. Additionally, it is noted that diagram 200 presents a simplified architecture that is decoupled from the underlying hardware—with reference to the example environment 100 of FIG. 1, it is appreciated that the Kafka cluster 210 can be provided by one or more computing nodes of the computing Clusters A, B, C, and D (noting that the computing nodes described with reference to FIG. 1 are also referred to herein as 'Kafka brokers' or simply 'brokers'). In some embodiments, ZooKeeper 206 can also be provided by one or more computing nodes of the computing Clusters A, B, C, and D, although ZooKeeper 206 may also be provided as a standalone component or module, with its own associated hardware elements.

Kafka cluster 210 is depicted as containing four brokers: broker 212, broker 214, broker 216, and broker 218. For the sake of simplicity, the following discussion assumes a 1:1 correspondence between one Kafka broker and one computing node, as they were discussed with respect to FIG. 1, although it is noted that it is not necessarily a requirement that a single Kafka broker correspond to a single computing node. The Kafka brokers 212-218 are responsible for maintaining published messages or streamed data received at Kafka cluster 210. Such published or streamed data is generated by the plurality of producers 202a, 202b, 202c, which are understood to comprise networked computing devices, or computing devices otherwise communicatively coupled to Kafka cluster 210 and ZooKeeper 206. As such, the plurality of producers 202 are typically external to Kafka cluster 210, and may additionally be external to the physical computing clusters or data centers (such as Clusters A, B, C, and D of FIG. 1) upon which Kafka cluster 210 resides. For example, a producer might be a computing device connected to a plurality of sensors generating sensor data at a rate of 60 Hz, such that the computing device uses a wired or wireless communication network or series of networks (such as network 102 of FIG. 1) to stream the 60 discrete sensor measurements from each sensor to Kafka cluster 210 every second.

Published messages or streamed data can be divided into one or more topics, such that a stream of messages belonging to a particular category is assigned the same topic. For example, in the context of the example above, the sensor data from each sensor of the plurality of sensors connected to the computing device might be assigned its own topic. Alternatively, data from the plurality of sensors might be assigned to a single topic on the basis that each sensor is connected to the same computing device. No matter the granularity with which topic assignation is performed, each topic is subsequently split into one or more partitions, and for each partition, Kafka cluster 210 keeps a minimum of one copy. The number of copies of each partition kept by Kafka cluster 210 can depend upon available storage and/or brokers and a desired replication policy for the given topic and partition.

For example, Kafka cluster 210 is illustrated as maintaining two copies of Partition 0, two copies of Partition 1, three copies of Partition 2, four copies of Partition 3, and four copies of Partition 4. The Partitions 0-4 might correspond to a single topic, or might correspond to different topics. For example, if the five partitions correspond to a single topic, it might be the case that Partitions 3 and 4 represent data deemed the most critical and are thus the only partitions with four total copies kept in Kafka cluster 210. On the other hand, if the five partitions correspond to multiple topics, it might be the case that Partitions 0 and 1 belong to a first topic with low importance, and hence two total copies of each are kept, Partition 2 belongs to a second topic with medium importance, and hence three total copies are kept, and Partitions 3 and 4 belong to a third topic with high importance, and hence four total copies of each are kept.

For each partition, no matter how copies are kept, a leader is elected, as indicated in diagram 200 by the heavier shading of the leader partition. For example, broker 212 is the leader for Partition 0, broker 214 is the leader for Partitions 1 and 2, broker 216 is the leader for Partition 3, and broker 218 is the leader for Partition 4. In general, ZooKeeper 206 manages leader election amongst the broker nodes storing copies of a given partition and the leader broker node subsequently manages write operations from the plurality of producers 202 and read operations from a plurality of consumers (not shown). Before publishing messages, a producer 202a can communicate with ZooKeeper 206 for purposes of topic assignment, partition assignment, or otherwise determining the leader broker within Kafka cluster 210 which should receive the published messages from producer 202a. As published messages or data streams are received at Kafka cluster 210, they are stored in a log in the memory of the leader broker for the appropriate partition for the published message or data stream. Remaining brokers also storing copies of the partition are referred to as follower brokers and generally act as consumers, pulling messages and data from the leader broker and updating their own memory and/or data stores. Note that a given broker can simultaneously act as both a leader broker and a follower broker, depending on the partition in question, and that a given broker can simultaneously assume multiple leader broker roles and multiple follower broker roles.

However, in standard Kafka implementations, while partition replicas are provided in an attempt to provide failure tolerance and disaster recovery of Kafka clusters, a number of issues persist with conventional solutions and approaches, as Kafka cannot provide any guarantee that a message received in memory at a leader broker, a follower broker, or both has in fact been persisted to disk. Consequently, Kafka is highly vulnerable to correlated data failures and errors which strike all partition copies (or their underlying hardware) simultaneously.

Kafka considers two different modes of replication—synchronous and asynchronous. In synchronous mode, a message to be published from a producer is ACKed only after it has been written to memory of the corresponding leader broker and all of the corresponding follower brokers. For example, a message to be published to Partition 0 would be ACKed only after being written to memory of leader broker 212 and written to memory of follower broker 214. Similarly, a message to be published to Partition 3 would be ACKed only after being written to memory of leader broker 216 and written to memory of follower brokers 212, 214, and 218. An immediate disadvantage is that the latency of synchronous mode can grow quickly as the number of replicas being kept increases. More generally, synchronous mode is limited by the speed of the slowest replica/follower broker, but can tolerate one or more broker failures.

Asynchronous mode, on the other hand, will ACK a message as soon as it is written to memory of the corresponding leader broker, and unlike synchronous mode, does not wait for the follower brokers. As such, asynchronous mode exhibits better throughput and lesser latency than synchronous mode, at the expense of being vulnerable to broker failures.

As mentioned previously, no matter whether synchronous or asynchronous mode is employed, Kafka cannot guarantee that a message received in memory at a leader broker, a follower broker, or both, has in fact been persisted to disk. Messages are only periodically transferred from broker memory to disk, and as such, there exists a period of time between the ACK (in either synchronous or asynchronous mode) and the transfer to disk in which one or more messages could be lost due to broker failure, memory failure, Kafka cluster failure, power outage, hardware failure, etc.

As such, it is contemplated that management service 206 can leverage rack awareness and broker hardware awareness, and more specifically, broker NVM capability awareness, to accelerate Kafka read, write, and replication operations. As indicated in diagram 200, management service 206 can communicate with each broker 212-218 of Kafka cluster 210 and retrieve 'rack-id' or other rack awareness information of the physical hardware configurations underlying each broker and further retrieve 'NVM-capable' or other characterizing information of each broker. In some embodiments, the rack awareness information can be implemented in accordance with conventional Kafka. In some embodiments, the rack awareness information can be implemented in conjunction with the NVM capability awareness in order to enable additional replication improvements such as multicast groups, as will be described later.

One or more of the rack awareness and the NVM capability information can be retrieved upon initialization or configuration of Kafka cluster 210, for example in a pull-type configuration wherein management service 206 actively retrieves or requests the information from the brokers 212-218 or in a push-type configuration wherein the brokers 212-218 actively transmit the information to management service 206. Management service 206 can further be active to monitor Kafka cluster 210 and brokers 212-218 for any state changes such that one or more of the rack awareness and NVM capability information are updated as needed. In some embodiments, one or more of the rack awareness and the NVM capability information are updated on a regular or pre-defined basis.

Figure 2:
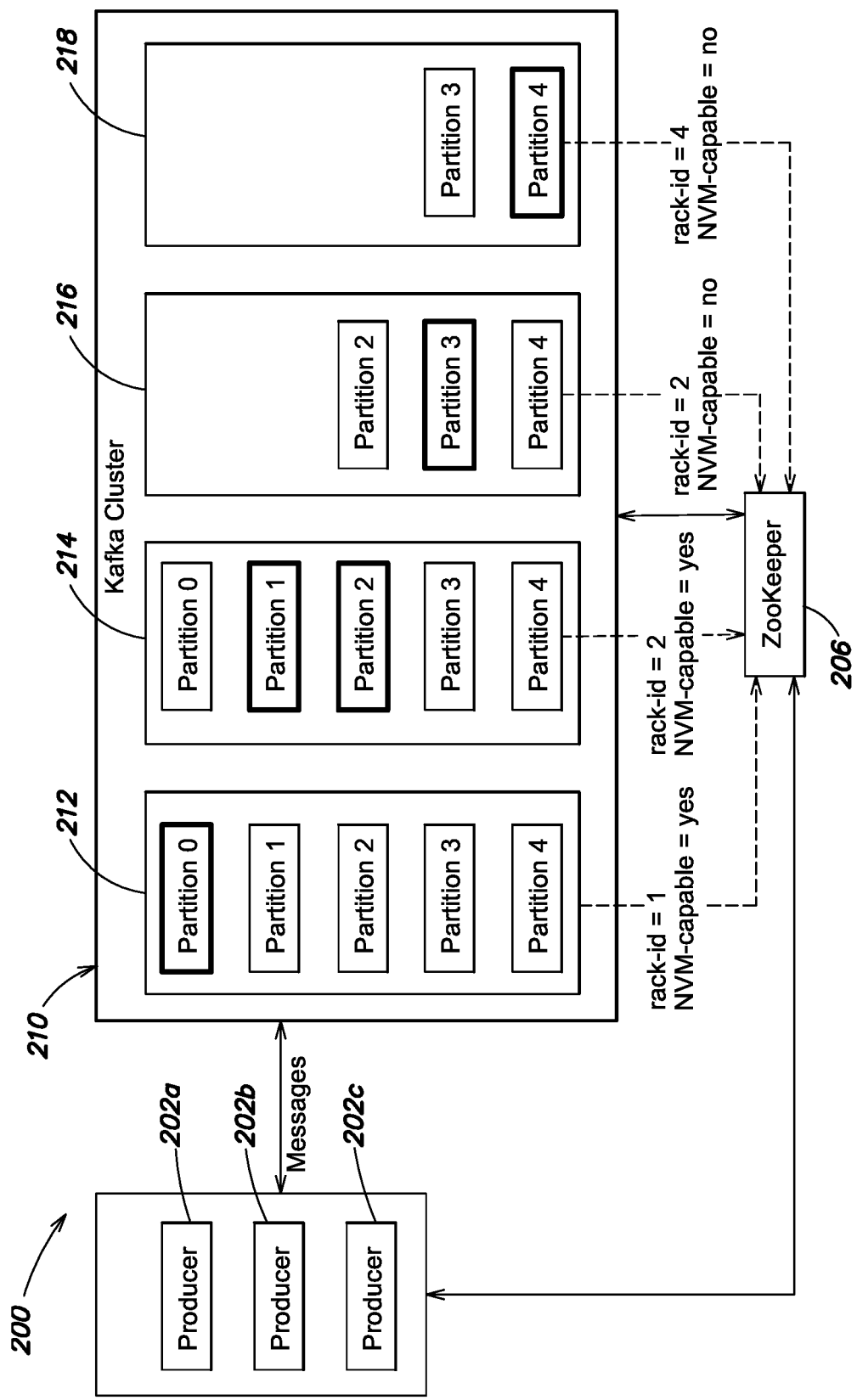
FIG. 2 depicts an example single Kafka cluster in which aspects of the present disclosure may operate.

NVM capability information, labeled in FIG. 2 as a Boolean variable named 'NVM-capable', is used to indicate whether or not a given broker possesses or is otherwise capable of accessing non-volatile memory (NVM). In instances where a given broker is comprised of multiple underlying compute nodes, the NVM capability information (and the rack awareness information) can be extended such that it is collected for each constituent compute node of the multi-node broker.

NVM is advantageous due to the fact that it can retrieve stored information after having been power cycled, as opposed to traditional RAM or computer memory which requires a constant supply of power in order to maintain stored information. While the NVM label can be applied to a great number of storage techniques and technologies, in the context of the present disclosure, NVM generally refers to high speed non-volatile memory that is able to substantially match the read/write performance of conventional RAM or computer memory. In light of this consideration, it is contemplated that NVM can be used to replace conventional RAM or computer memory entirely in the broker, or might be used to supplement conventional RAM or computer memory also utilized by the broker.

Because NVM provides persistent data storage in the event of a power loss, power cycle, or power interruption, its use can advantageously solve the existing problem in Kafka wherein there is no guarantee that messages written to worker memory will be persisted to disk. However, it is impractical to replace RAM or conventional memory entirely within every broker node of a Kafka cluster, and as such, it is contemplated that management service 206 is operable to obtain this NVM-capability information in order to ascertain the specific broker nodes within Kafka cluster 210 that offer NVM-capability, and thus, improved performance. With this knowledge and system characterization in hand, the overall Kafka performance in read, write, and replication operations can be accelerated.

As depicted in FIG. 2, brokers 212 and 214 are determined to be NVM capable while brokers 216 and 218 are determined not to be NVM capable. This information can be stored in a data store (internal or external) of management service 206, or in a data structure such as a lookup table. As discussed previously, the NVM capability information can be integrated with rack awareness information of the brokers 212-218 of Kafka cluster 210, or can be provided in a standalone fashion.

Thus, management service 206 is operable to analyze incoming data streams or message publication requests from one or more of the plurality of producers 202a-c and optimally assign replica partitions across the constituent brokers 212-218 of Kafka cluster 210. In particular, management service 206 can prioritize brokers that are NVM capable to store one or more partitions corresponding to an incoming data stream or message publication. This NVM capability information can be utilized alongside the rack awareness information in a partition assignment algorithm of management service 206, such that broker selection is performed not only in view of NVM capability, but also in view of the relationships and communicative interconnections or links between the various brokers 212-218 of Kafka cluster 210.

For example, note that Partition 0 and Partition 1, both of which required only two partition copies, are both assigned to brokers 212 and 214—the NVM capable brokers of Kafka cluster 210. Because an NVM capable broker offers greater reliability and accelerated Kafka performance, management service 206 first checks if the NVM capable brokers have available capacity, and if so, subsequently assigns at least one partition copy to be stored at the NVM capable broker. Indeed, it can be seen from FIG. 2 that the NVM capable brokers 212 and 214 are assigned to store a copy of each partition that is present within Kafka cluster 210—while the overall performance of partitions that are split across NVM capable and non-NVM capable brokers, such as Partitions 2, 3, and 4, may be lesser than the performance of partitions that are split only across NVM capable brokers, the storage of at least one copy of each partition on an NVM capable node greatly reduces, or eliminates entirely, the pre-existing issue in Kafka wherein an ACKed message fails to be persisted to disk. This is because, in the case of a power interruption, the NVM capable brokers will maintain the messages stored in NVM and can subsequently persist these messages to disk once power is restored, as opposed to the non-NVM capable brokers which will lose the messages stored in memory and will furthermore have no record of the lost messages once power is restored.

In some embodiments, particularly those in which a partition must be stored on both NVM capable and non-NVM capable nodes, management service 206 can be configured to further give a leader priority to NVM capable brokers. Because the leader broker receives write requests first (i.e. directly from a producer), the possibility of a message being lost due to the failure of a non-NVM capable leader broker is eliminated. Consequently, if an NVM capable broker is available and is selected as the partition leader, management service 206 can in some embodiments automatically configure the partition replication to be performed in asynchronous mode—because the message is guaranteed to be persistent in the NVM of the leader (assuming that the message write into NVM is completed, i.e. assuming that the NVM capable broker does not fail immediately), an ACK can be sent as soon as the NVM capable leader broker completes the write of the message into its NVM.

In instances where a non-NVM broker is elected as leader, as is the case with Partitions 3 and 4, then no such guarantee is provided for asynchronous mode, even if an NVM broker is present as a follower broker for the partition. This is because, as mentioned previously, a failure of the non-NVM capable leader broker could occur immediately after the message is received into conventional RAM causing all follower brokers to fail to retrieve the message and replicate it. However, this issue is alleviated by the use of synchronous mode, wherein the ACK is not transmitted until all brokers have replicated the message into their memory, whether conventional or NVM. In some embodiments, the present disclosure can include a modified synchronous mode, wherein an ACK is generated as soon as the message is replicated into memory of one NVM broker, as at this point, the message is guaranteed to be persistent in at least this one NVM broker, no matter if it is a leader or a follower.

Figure 3:
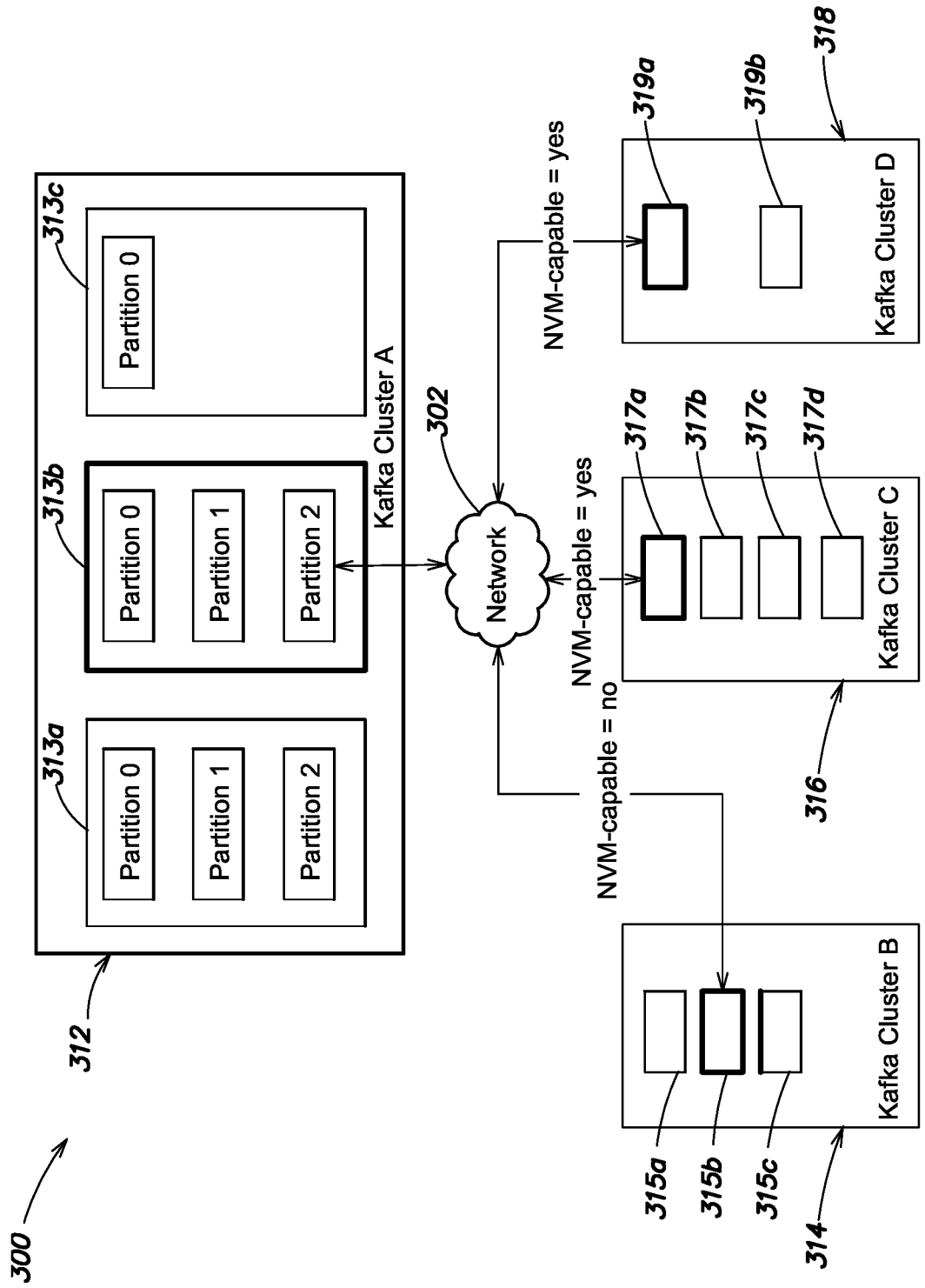
FIG. 3 depicts an example set of Kafka clusters in which aspects of the present disclosure may operate.

FIG. 3 depicts a diagram 300 illustrating an exemplary replication process of the present disclosure as applied to replication between Kafka clusters. For purposes of clarity, diagram 300 depicts a simplified architecture consisting of four Kafka clusters 312, 314, 316, 318, alternately referred to herein as Kafka clusters A, B, C, and D, respectively, and a network 302. As illustrated, Kafka clusters A-D are all communicatively linked indirectly through network 302, although it is appreciated that various other communicative couplings, direct or otherwise, may be employed without departing from the scope of the present disclosure.

In some embodiments, each Kafka cluster might be provided at a separate data center, or if Kafka clusters share data centers, each Kafka cluster might be provided on a unique selection of underlying hardware, the underlying goal being to avoid a rack-wide or a data-center wide failure affecting more than one Kafka cluster. Because rack failures and data center downtime become increasingly problematic with scale, it can oftentimes be desirable to replicate entire Kafka clusters (which of course themselves have their own internal partition replicas). A Kafka cluster can be replicated as a singular entity, e.g. all constituent brokers 313a-c of Kafka cluster A are replicated to Kafka cluster C, or as distributed entities, e.g. broker 313a is replicated to Kafka cluster B, broker 313b is replicated to Kafka cluster C, and broker 313c is replicated to Kafka cluster D.

Conventionally, Kafka provides a MirrorMaker tool for replicating a desired Kafka cluster. However, a first drawback of MirrorMaker is the fact that a source Kafka cluster is replicated only to a single target (destination) Kafka cluster, where MirrorMaker is locally provided. In other words, in the context of FIG. 3, MirrorMaker could be embedded in Kafka Cluster B in order to entirely replicate Kafka cluster A onto one or more of the brokers 315a-c of Kafka Cluster B, but MirrorMaker could not replicate Kafka Cluster A partially onto Kafka Cluster B and partially on to Kafka Cluster C without separate MirrorMaker instances being provided on both clusters B and C. Additionally, MirrorMaker is hampered by the fact that the destination Kafka cluster often lags far behind the source Kafka cluster due to network latency, and the fact that the maximum parallelism of MirrorMaker consumers (e.g. number of simultaneous replication operations) is fundamentally constrained by the number of partitions in the source Kafka cluster that is being replicated. Consequently, the destination Kafka cluster and MirrorMaker are likely to have a significant number of idle consumers, which undesirable reduces consumer throughput. Additionally, because MirrorMaker is provided as an integrated consumer/producer pair, it operates over the same network channels and communication links as actual producers and consumers that are external to the Kafka cluster(s), and as such, Kafka cluster replication operations can consume valuable network bandwidth to the point that the network, and therefore the Kafka cluster(s) become choked.

Accordingly, it is contemplated that the NVM capability enhanced approached described with respect to FIG. 2 can be applied to Kafka cluster replication in lieu of MirrorMaker. In particular, Kafka cluster replication is improved via the overall the read/write acceleration described previously and is further improved by the integration of IP multicast groups such that the Kafka cluster replication is hardware driven rather than software driven, as in the case of MirrorMaker.

Each Kafka cluster A-D has an overall leader broker, as indicated by the heavier line weight used to illustrate the leader broker of each cluster. Cluster A's leader broker is broker 313b, Cluster B's leader broker is broker 315b, Cluster C's leader broker is broker 317a, and Cluster D's leader broker is broker 319a. In some embodiments, the Kafka cluster leader broker is separate and distinct from the management service 206 described previously. In some embodiments, the Kafka cluster leader broker functionality can be partially or wholly provided by management service 206.

When a Kafka cluster replication operation is desired, the leader broker of the source Kafka cluster creates a unique IP multicast group. For example, if Kafka cluster A is the source cluster for replication, then leader broker 313b creates a unique IP multicast group. The leaders in all target Kafka clusters then subscribe to this multicast group. For example, if Kafka clusters B-D are all target clusters, then the leader brokers 315b, 317a, and 319a will all subscribe to the IP multicast group created by leader broker 313b of source Kafka cluster A. In some embodiments, one or more of leader broker 313b of source Kafka cluster A and a management service (not shown) of source Kafka cluster A maintain a topographical map or an awareness of the additional Kafka clusters that are accessible via network 302, i.e. the Kafka clusters that could potentially act as destination clusters for the cluster replication operation. In some embodiments, real-time availability or workload information for the additional Kafka clusters can be maintained by source Kafka cluster A and/or by a central monitoring agent (not shown) communicatively coupled to each of the Kafka clusters A-D. From the topographical map or monitoring/awareness information, the selection of desired target Kafka clusters to act as destination clusters for the replication operation are selected.

Thus, the IP multicast group is configured such that the leader broker 313b of the source Kafka cluster A is the multicast source and the leader brokers 315b, 317a, and 319a are all subscribers to the multicast group. In some embodiments, further hardware acceleration can be provided by configuring the Kafka clusters (and the intervening routers provided along network 302 and the communicative links between Kafka clusters A-D) with Protocol Independent Multicast Source-Specific Multicast (PIM-SSM) routers, thereby enabling a maximally efficient multicast distribution of the Kafka cluster replication information.

With the IP multicast group setup, the leader broker 313b of source Kafka cluster A transmits a replication request to the leader brokers 315b, 317a, and 319a of the subscribed Kafka clusters B-D and the Kafka cluster replication is automatically taken care of by the network replication tree, avoiding the bandwidth, latency, and software-governed issues associated with the conventional MirrorMaker tool. Additionally, multiple multicast groups can be created by leader broker 313b of source Kafka cluster A in order to effect a distributed replication of Kafka cluster A. For example, a first multicast group might distribute broker 313a of source Kafka cluster A to destination Kafka clusters B and C, a second multicast group might distribute broker 313b to clusters B and D, and a third multicast group might distribute broker 313c to clusters C and D. As was the case with the inter-Kafka cluster replication discussed with respect to FIG. 2, leader brokers can be elected with priority to NVM capable brokers, and cluster replication data can be ACKed as soon as it is written into the NVM of at least one NVM capable broker at a given destination Kafka cluster.

Figure 4:
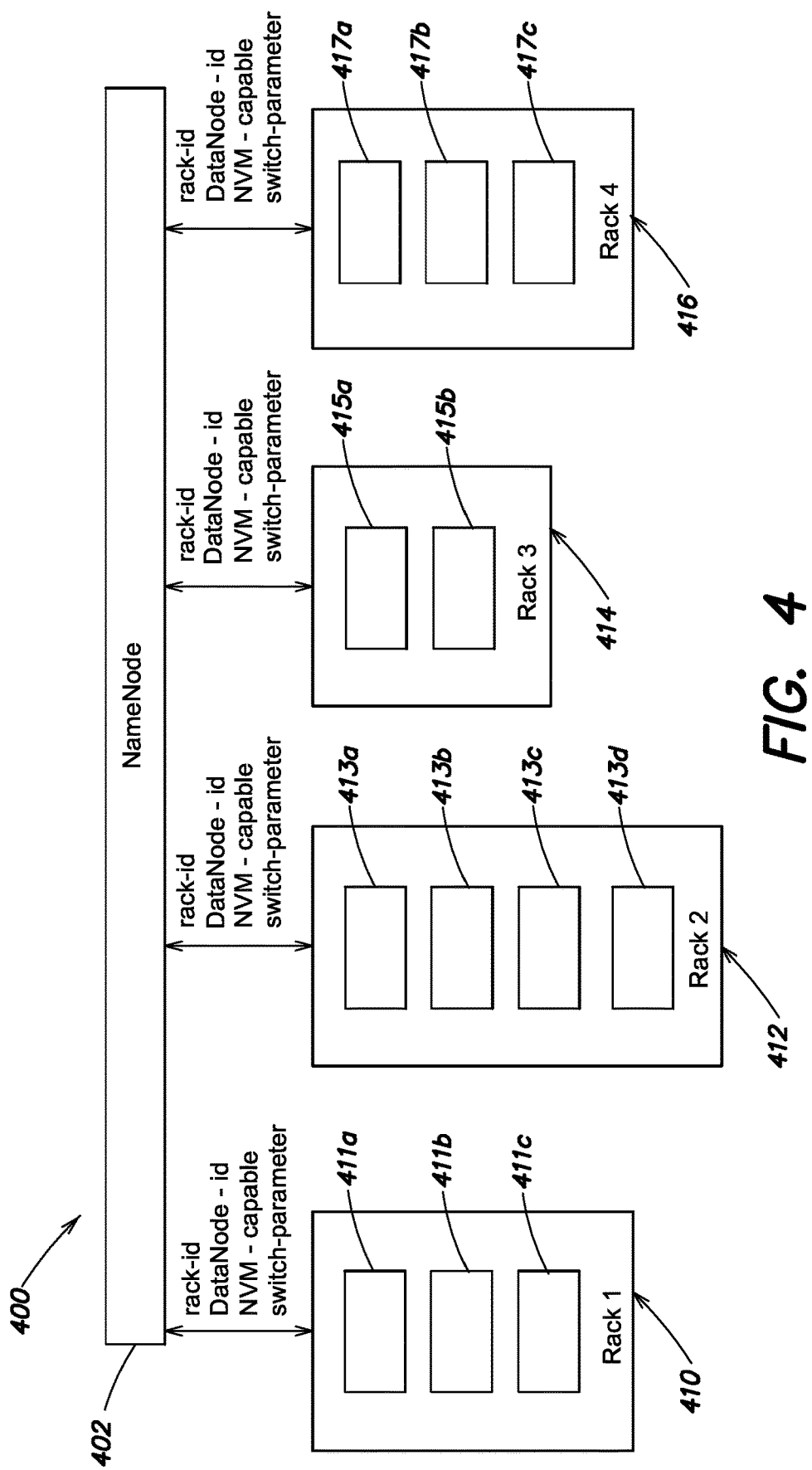
FIG. 4 depicts an example HDFS cluster in which aspects of the present disclosure may operate.

The disclosure turns now to FIG. 4, which depicts a diagram 400 of a computing architecture utilizing Apache Hadoop and HDFS. Similar to Apache Kafka, Hadoop and HDFS can be employed for purposes of storing and processing large amounts of data, and are particularly useful in big data applications. Using the previously described NVM awareness and multicast techniques, Hadoop and HDFS read, write, and replication operations can be similarly accelerated and improved.

HDFS employs a master-slave architecture, wherein an HDFS cluster consists of a single NameNode operating as master and one or more DataNodes operating as slaves to the NameNode. FIG. 4 depicts a master NameNode 402 coupled to a plurality of DataNodes organized into four racks: Rack 1 contains DataNodes 411a-c, Rack 2 contains DataNodes 413a-d, Rack 3 contains DataNodes 415a-b, and Rack 4 contains DataNodes 417a-c, although of course other rack and DataNode configurations can be employed without departing from the scope of the present disclosure. In operation, received files are split into one or more blocks, typically of equal size, and distributed across the plurality of DataNodes by NameNode 402. In general, the plurality of DataNodes are operable to perform block creation, block deletion, and block replication based on one or more instructions from NameNode 402.

In a first embodiment, rack awareness information can be transformed into one or more multicast group mappings in order to accelerate HDFS performance. For example, a multicast group could be configured to only contain DataNodes from the same rack, e.g. a first multicast group could contain DataNodes 411*a-c* of Rack 1, a second multicast group could contain DataNodes 413*a-d* of Rack 2, a third multicast group could contain DataNodes 415*a-b* of Rack 3, and a fourth multicast group could contain DataNodes 417*a-c* of Rack 4. This example is provided for purposes of illustration, and is not intended to be limiting—it is understood that various other multicast groups can be configured in order to enhance replication operations between DataNodes of different racks (for example, a multicast group might include DataNodes of a first rack and DataNodes of a second rack, such that the multicast group can be utilized to locally replicate a given block on one DataNode of the first rack and remotely replicate the given block on two DataNodes of the second rack).

Additionally, rack awareness information can be extended to include switch parameters and other networking configuration information associated with a rack, constituent DataNodes of a rack, and communicative paths available to the DataNodes of a rack in order to enable the construction of the aforementioned multicast groups based at least in part on the rack awareness information. Such features are currently not found in Hadoop or HDFS, and as such, the disclosed modifications are operable to accelerate both Hadoop and HDFS and increase overall efficiency and reliability.

It is further contemplated that the presently disclosed NVM capability monitoring can be utilized to improve HDFS erasure coding, which can be used in place of standard replication operations. Erasure coding transforms input data bits into blocks containing data bits and parity bits, where the parity bits are uniquely calculated based on the associated data bits to thereby provide fault tolerance and error recovery. For example, a common form of erasure coding (EC) is known as Reed-Solomon (RS) erasure coding, which is configurable with two parameters, k and m. RS erasure coding generates coded outputs consisting of k data bits and m parity bits generated from the k data bits. Storage failures and other errors can be recovered as long as k out of the (k+m) coded output bits are still available. In other words, RS(k,m) erasure coding can tolerate the failure of any m cells. Hence, it is desirable to optimize the selection of k DataNodes of the HDFS cluster for data placement and the selection of m DataNodes of the HDFS cluster for parity placement.

In terms of data write operations, a series of asynchronous data streaming operations are performed to each DataNode to which a given client intends to write data. Using at least the rack awareness information, the client attempts to choose the best k DataNodes for placement. In accordance with the present disclosure, the client (either on its own or with assistance from NameNode 402) accesses NVM capability information of the available DataNodes being considered for the write operation, and attempts to select k DataNodes with NVM capability that also meet other required performance criteria for the write operation. As such, a modified DataNode selection algorithm gives priority to DataNodes with NVM capability for selection amongst the group of k DataNodes required to store the data bits. If insufficient NVM capable DataNodes are available, the modified selection algorithm can attempt to maximize the number of NVM capable DataNodes that are available for storage of the k data bits, and in some cases, may allocate multiple data bits to a single NVM capable DataNode such that all k data bits are stored on an NVM capable node. The remaining m DataNodes to store the parity bits can also be prioritized for assignment to NVM capable nodes, although this is not required, particularly assuming that all k data bits have been assigned to NVM capable nodes already. Rather, the m parity bits can be placed as desired based on information besides NVM capability. In some embodiments, the m parity bits can be placed randomly, based on performance requirements and failure domains, or on racks in close proximity to the racks containing the DataNodes selected to store the k data bits. In some embodiments, the m parity bits can be placed across the set of DataNodes without NVM capability, in order to ensure that the NVM capable DataNodes are maximally available to store only data bits while non-NVM capable DataNodes store only parity bits. In this manner, by leveraging NVM capability and NVM capability awareness, general write operations can be accelerated.

In replica operations, the modified block placement algorithm disclosed herein can employ any suitable placement rules or provisions currently utilized with HDFS, thereby providing a more seamless integration with existing systems. For example, as mentioned briefly above, many HDFS replicas are designed such that a first replica is stored on the local DataNode (e.g. same DataNode) of the original block being replicated, a second replica is stored on a second DataNode on a different rack from the local DataNode, and the third replica is stored on a third DataNode on the same rack as the second DataNode. The disclosed system, method, and technique of leveraging NVM capability information therefore advantageously remains flexible to implementing various replica distribution schemes as desired while still maintaining the added NVM awareness analysis.

For HDFS read operations, a client desiring to perform a read can select any k DataNodes out of the desired (k+m) bit coded block and apply the RS erasure coding in reverse to recover the entire coded block from the k DataNodes or the k bits. To perform a selection of DataNodes for a read operation, the client can access and retrieve a listing of available DataNodes containing relevant bits for the desired operation (e.g. retrieve from NameNode 402 or a coupled data store of NameNode 402). In some embodiments, the client can access a block allocation API which describes the list of data nodes for every given file block. In conventional HDFS read operations, a selection of the minimal k DataNodes required to perform a read is considered risky—a single fault and the read operation will be compromised, the entire coded block unable to be recovered. As such, a margin of error is often provided with conventional HDFS read operations, e.g. retrieving k+1 or k+2 data blocks to improve the likelihood of performing a successful read. However, by allocating at least k bits of every (k+m) blocks to an NVM capable node, it is newly possible for clients to retrieve only the minimum k bits required for a read operation, based on the robust failure tolerance of NVM capable nodes, which again, provide persistent data storage in the case of power failure or interruption. Accordingly, the previous calculus of selecting the k DataNodes yielding the best performance without compromising failure tolerance beyond an unacceptable threshold can be avoided in many cases, given that at least k bits of the desired (k+m) bit coded block are available from an NVM capable DataNode. Similarly, in recovery operations, e.g. undertaken in response to a detected failure or error, NVM capable DataNodes can be prioritized over non-NVM capable DataNodes in order to further accelerate the recovery operation.

In some embodiments, one or more DataNodes (or the hardware underlying one or more serverless DataNodes) may be associated with an embedded FPGA (field-programmable gate array), which can enable further acceleration and performance gains on top of those achieved by the above disclosure. In particular, embedded FPGAs can be leveraged by calling erasure coding routines written in OpenCL using Java Native interfaces, where the erasure coding routines make use of block allocation info exposed by the block allocation API of HDFS to read and process incredibly large amounts of data at a rate far higher than otherwise achievable without embedded FPGAs. By configuring embedded FPGAs to read and process data with a priority/preference to NVM capable nodes, this accelerated read rate can be increased even further.

Figure 5:
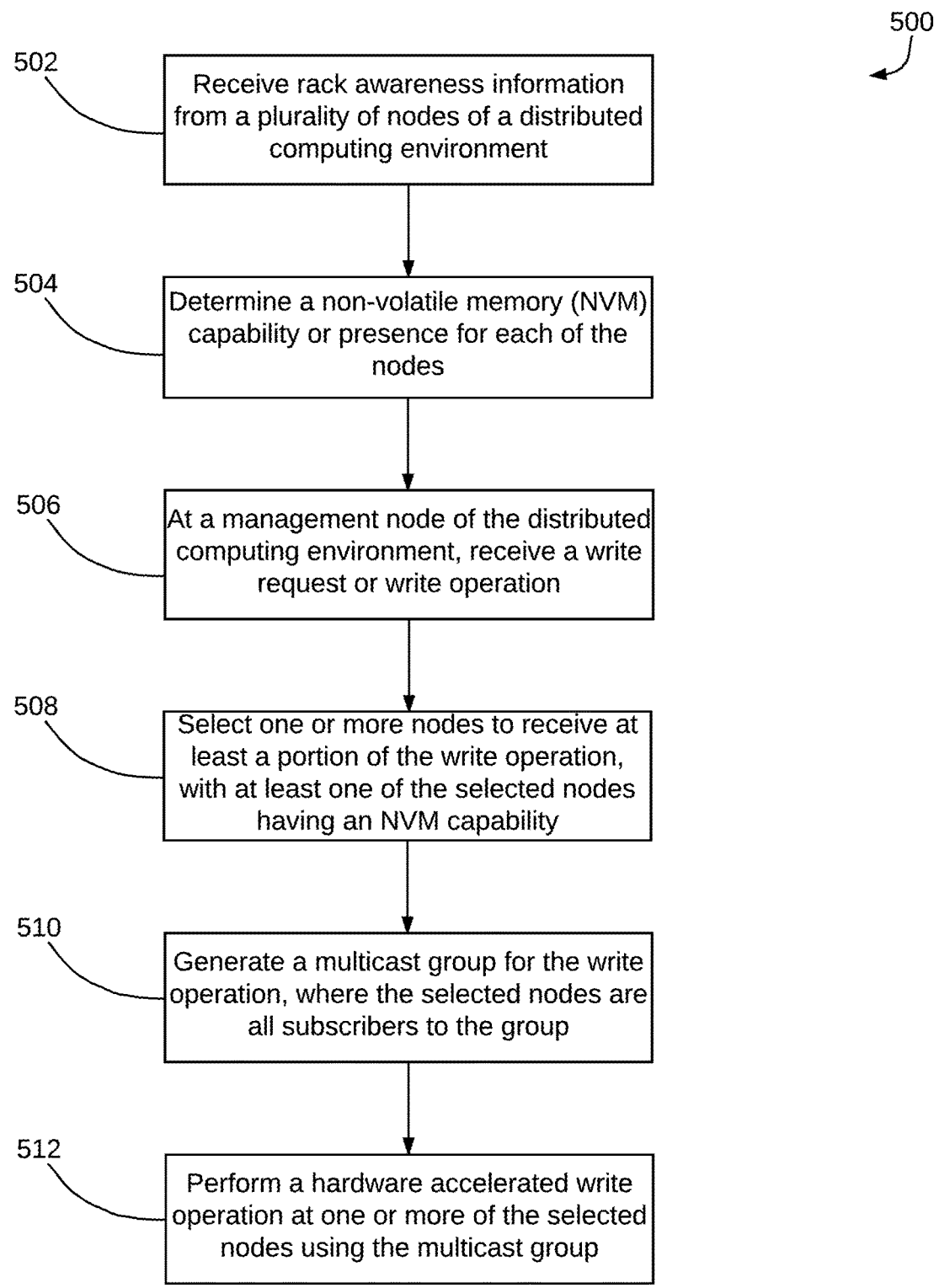
FIG. 5 depicts a flowchart of an example method of the present disclosure.

FIG. 5 depicts an example flowchart 500 of a method of the present disclosure. The method begins with a step 500, wherein rack awareness information is received from a plurality of nodes of a distributed computing environment. As mentioned previously, this distributed computing environment can be provided by Apache Kafka or Apache HDFS, although other distributed computing environments may also be employed without departing from the scope of the present disclosure. The rack awareness information can include, for example, information regarding the physical server or hardware device upon which a given node is running, and information regarding the relative positioning between the node's physical server or hardware device and the physical servers or hardware devices of other nodes (e.g. a first node might be on rack 5, slot F, while a second node might be on rack 7, slot B).

In a next step 504, a non-volatile memory (NVM) capability or presence for each of the nodes is determined. An NVM capability might be a Boolean variable indicating whether or not the given node either possesses or otherwise has access to some form of NVM. In some embodiments, the NVM capability might be extended to include specific information regarding the type or nature of NVM with which a given node is associated. For example, extended NVM capability information might include a quantification of the amount of NVM storage available to the node, a speed of the NVM storage, or other such properties and factors.

In a step 506, a management node of the distributed computing environment (which itself might be selected from amongst the plurality of nodes discussed in steps 502 and 504) receives a write request or a write operation. For example, the write request or write operation might come from an external or third-party client or user, e.g. of the distributed computing system. It is noted that step 506 need not necessarily occur only after steps 502 and 504—in some embodiments, step 506 may occur prior to or concurrent with one or more of steps 502 and 504.

In response to the write request of step 506, the method proceeds to a step 508 wherein one or more nodes are selected to receive at least a portion of the write request/operation. The selection of the one or more nodes is made such that at least one of the selected nodes has an NVM capability (assuming that an NVM capability is present at at least one of the plurality of nodes). The selection can be made solely on the basis of maximizing NVM capable nodes, with the remaining nodes being selected randomly or in accordance with desired operational parameters and characteristics of the write request/operation. In some embodiments, the selection may be made wherein NVM capability is an additional weighted parameter to be considered in performing an optimized selection of nodes across the pool of the plurality of nodes, as described previously herein.

The method continues to a next step 510, wherein after selecting the nodes to receive at least a portion of the write operation, a multicast group is created with the selected nodes as subscribers. In some embodiments, the leader of the multicast group can be a different node which directly stores the data to be written to the multicast group or otherwise provides a point of access to the data to be written to the multicast group. In some embodiments, this leader might be selected to also have an NVM capability, if available.

Finally, with the multicast group created, a hardware accelerated write operation is performed in a step 512 by transmitting a replicate command into the multicast group and causing each of the subscribed, selected nodes to retrieve the desired content for the write operation from the leader of the multicast group. In some embodiments, one or more nodes of the selected nodes having an NVM capability might be amongst the initial subscriber nodes to receive the data in the multicast group, such that the received data is persisted to the NVM (thereby guarding against failures and data loss) before it is distributed on to the remaining nodes (whether NVM capable or non-NVM capable).

Figure 6A:
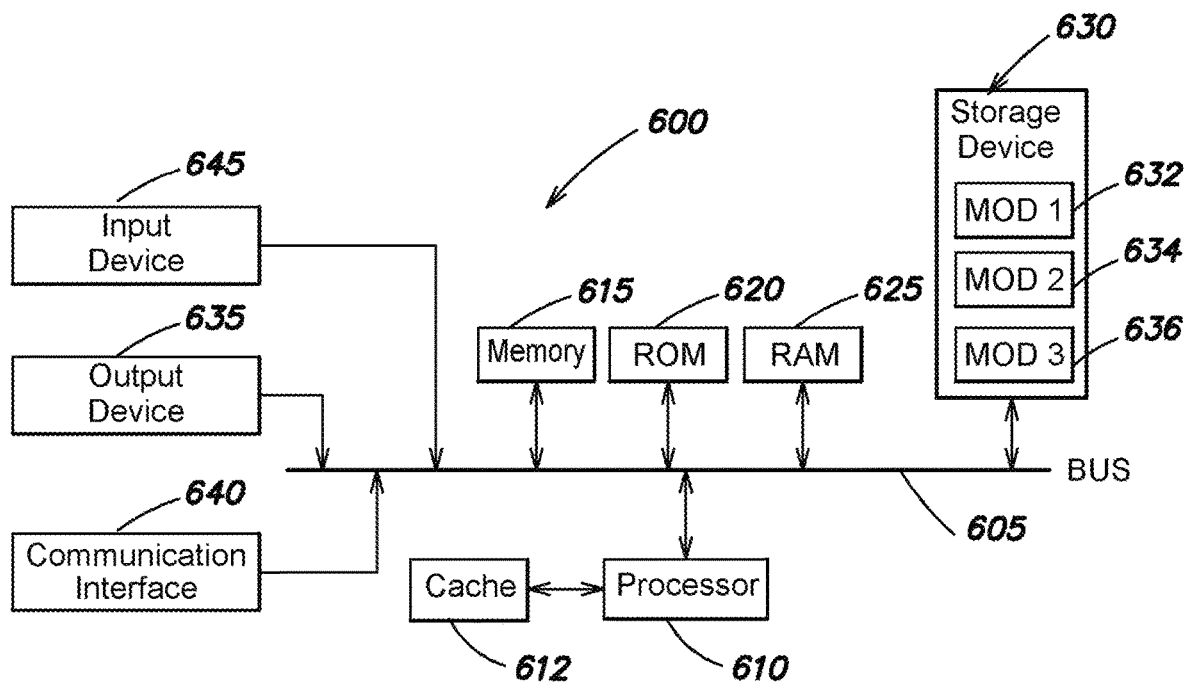
FIGS. 6A and 6B illustrate schematic diagrams of example computing systems for use with example system embodiments.
Figure 6B:
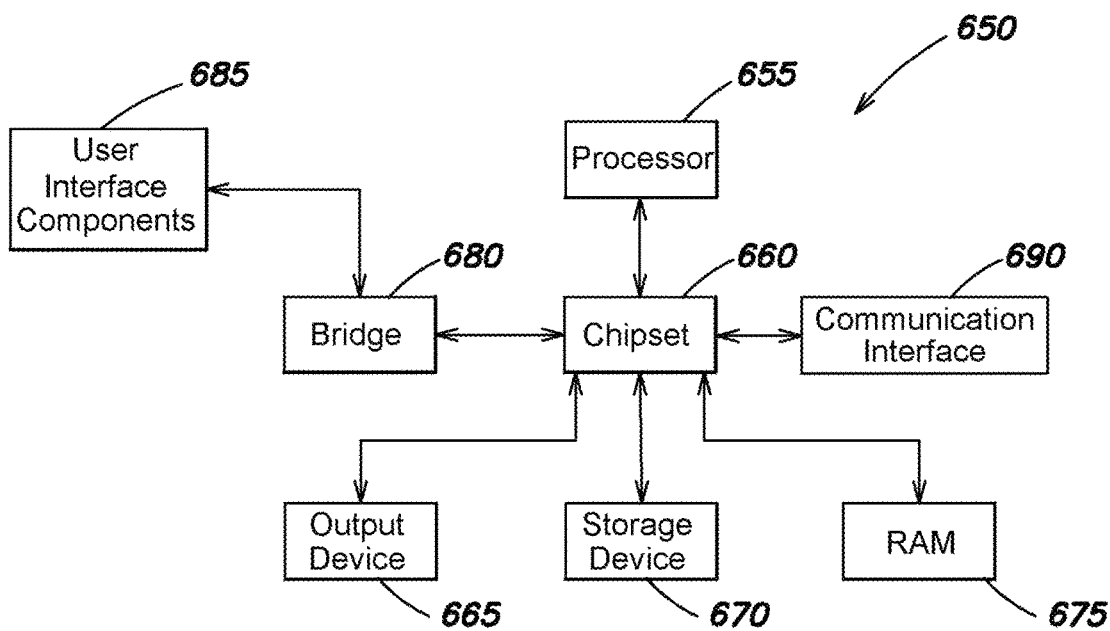

FIG. 6A and FIG. 6B illustrate example computing systems for use as a control device in the example system embodiments. The more appropriate embodiment will be apparent to those of ordinary skill in the art when practicing the present technology. Persons of ordinary skill in the art will also readily appreciate that other system embodiments are possible.

FIG. 6A illustrates a conventional system bus computing system architecture 600 wherein the components of the system are in electrical communication with each other using a bus 605. Exemplary system 600 includes a processing unit (CPU or processor) 610 and a system bus 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software modules 632, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

FIG. 6B illustrates an example computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. In this example, chipset 660 outputs information to output device 665, such as a display, and can read and write information to storage device 670, which can include magnetic media, and solid state media, for example. Chipset 660 can also read data from and write data to RAM 675. A bridge 660 for interfacing with a variety of user interface components 665 can be provided for interfacing with chipset 660. Such user interface components 665 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 665 and execute appropriate functions, such as browsing functions by interpreting these inputs using processor 655.

It can be appreciated that example systems 600 and 650 can have more than one processor 610 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the aforementioned description can be implemented using computer-executable instructions that are stored or otherwise available from computer readable media. Such instructions can comprise instructions and data which cause or otherwise configure a general purpose computer, special purpose computer, or special purpose processing device to perform a certain function or group of functions. Portions of computer resources used can be accessible over a network. The computer executable instructions may be binaries, intermediate format instructions such as assembly language, firmware, or source code. Computer-readable media that may be used to store instructions, information used, and/or information created during methods according to the aforementioned description include magnetic or optical disks, flash memory, USB devices provided with non-volatile memory, networked storage devices, and so on.

For clarity of explanation, in some instances the present technology may be presented as including individual functional blocks including functional blocks comprising devices, device components, steps or routines in a method embodied in software, or combinations of hardware and software.

The computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing methods according to these disclosures can comprise hardware, firmware and/or software, and can take any of a variety of form factors. Such form factors can include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device.

The instructions, media for conveying such instructions, computing resources for executing them, and other structures for supporting such computing resources are means for providing the functions described in these disclosures.

Although a variety of information was used to explain aspects within the scope of the appended claims, no limitation of the claims should be implied based on particular features or arrangements, as one of ordinary skill would be able to derive a wide variety of implementations. Further, although some subject matter may have been described in language specific to structural features and/or method steps, it is to be understood that the subject matter defined in the appended claims is not necessarily limited to these described features or acts. Such functionality can be distributed differently or performed in components other than those identified herein. Rather, the described features and steps are disclosed as possible components of systems and methods within the scope of the appended claims. Moreover, claim language reciting "at least one of" a set indicates that one member of the set or multiple members of the set satisfy the claim.

We claim:

1. A method comprising:
retrieving rack awareness information characterizing a plurality of nodes of a distributed computing environment, wherein the rack awareness information is indicative of hardware configuration information of the plurality of nodes;
determining, based on the rack awareness information, a set of nodes of the plurality of nodes having a non-volatile memory (NVM) capability;
receiving, at a management node of the plurality of nodes, a write operation;
selecting one or more nodes of the set of nodes having the NVM capability to receive at least a portion of the write operation, the one or more nodes being selected based on the NVM capability of the one or more nodes and a higher priority of the one or more nodes than other nodes lacking the NVM capability;
in response to receiving the write operation and selecting the one or more nodes, generating, using the management node, a multicast group associated with the write operation, the multicast group comprising the selected one or more nodes having the NVM capability, wherein the selected one or more nodes are subscribers of the multicast group;
sending, to the multicast group, a first request to store, at the one or more nodes having the NVM capability, first data associated with the write operation; and
based on an unavailability of nodes having the NVM capability, sending, to one or more different nodes selected to store parity bits associated with the first data, a second request to store the parity bits associated with the first data, the one or more different nodes being selected to store the parity bits based on a lower priority of the one or more different nodes than the one or more nodes of the set of nodes, the lower priority being based on a lack of NVM capability of the one or more different nodes.

2. The method of claim 1, wherein the distributed computing environment comprises one or more node clusters associated with a publish-subscribe event streaming platform, wherein the one or more node clusters comprise the plurality of nodes, wherein the management node is an elected leader broker of the plurality of nodes and is configured as a source of the multicast group, and wherein the write operation is a partition replication operation performed across the plurality of nodes.

3. The method of claim 1, wherein the plurality of nodes is configured to maintain published messages or streamed data received at one or more node clusters associated with the plurality of nodes.

4. The method of claim 1, wherein the distributed computing environment comprises one or more node clusters associated with a publish-subscribe event streaming platform, wherein the plurality of nodes comprise a plurality of elected leader brokers, each elected leader broker corresponding to one of the one or more node clusters, wherein the management node is the elected leader broker of a source cluster and is configured as a multicast source of the multicast group, wherein the selected set of nodes are the elected leader brokers of target clusters, and wherein the write operation is a cluster replication operation performed across the target clusters.

5. The method of claim 4, wherein each cluster is coupled to a Protocol Independent Multicast source-specific multicast (PIM-SSM) router such that each cluster receives multicast traffic directly from the multicast source.

6. The method of claim 1, wherein the distributed computing environment comprises a distributed file system, and wherein the rack awareness information comprises switch parameters of a plurality of switches associated with a given rack or associated with the distributed file system.

7. The method of claim 6, wherein the write operation is a HDFS block replication operation and the switch parameters are utilized to generate the multicast group associated with the block replication operation.

8. The method of claim 6, wherein the write operation is a Reed-Solomon erasure coding operation such that a total number of bits of a given file system block is equal to a first number of data bits plus a second number of parity bits such that the given file system block can be fully recovered from any selection of bits that is greater than or equal to the first number of data bits.

9. The method of claim 8, wherein the selected one or more nodes are selected such that the first number of data bits is assigned across available nodes with an NVM capability and the second number of parity bits is assigned across particular nodes meeting one or more of performance requirements and failure domains specified by the management node.

10. The method of claim 6, further comprising attempting to retrieve a corresponding selection of bits from at least one node with the NVM capability and, based on an insufficient number of nodes with the NVM capability being available, retrieving a remaining selection of bits from particular nodes based on the rack awareness information.

11. The method of claim 6, further comprising:
retrieving block allocation information from a file system block allocation Application Programming Interface (API); and
based on the block allocation information for one or more files, permitting one or more embedded field-programmable gate arrays (FPGAs) to read and process corresponding data from one or more nodes, wherein the one or more embedded FPGAs first attempt to read and process data from any available nodes with an NVM capability before attempting to read and process data from other nodes without an NVM capability.

12. A non-transitory computer-readable device having stored therein instructions which, when executed by at least one processor, cause the at least one processor to perform operations comprising:
retrieving rack awareness information characterizing a plurality of nodes of a distributed computing environment, wherein the rack awareness information is indicative of hardware configuration information of the plurality of nodes;
determining, based on the rack awareness information, a set of nodes of the plurality of nodes having a non-volatile memory (NVM) capability;
receiving, at a management node of the plurality of nodes, a write operation;
selecting one or more nodes of the set of nodes having the NVM capability to receive at least a portion of the write operation, the one or more nodes being selected based on the NVM capability of the one or more nodes and a higher priority of the one or more nodes than other nodes lacking the NVM capability;

in response to receiving the write operation and selecting the one or more nodes, generating, using the management node, a multicast group associated with the write operation, the multicast group comprising the selected one or more nodes having the NVM capability, wherein the selected one or more nodes are subscribers of the multicast group;

sending, to the multicast group, a first request to store, at the one or more nodes having the NVM capability, first data associated with the write operation; and based on an unavailability of nodes having the NVM capability, sending, to one or more different nodes selected to store parity bits associated with the first data, a second request to store the parity bits associated with the first data, the one or more different nodes being selected to store the parity bits based on a lower priority of the one or more different nodes than the one or more nodes of the set of nodes, the lower priority being based on a lack of NVM capability of the one or more different nodes.

13. The non-transitory computer-readable device of claim 12, wherein:
the distributed computing environment comprises one or more node clusters associated with a publish-subscribe event streaming platform;
the plurality of nodes comprise a plurality of elected leader brokers, each elected leader broker corresponding to one of the one or more node clusters;
the management node is the elected leader broker of a source cluster and is configured as a multicast source of the multicast group;
the selected set of nodes are the elected leader brokers of target clusters; and
the write operation is a cluster replication operation performed across the target clusters.

14. A system comprising:
one or more processors; and
at least one non-transitory computer-readable medium having stored thereon instructions which, when executed by the one or more processors, cause the system to:
retrieve rack awareness information characterizing a plurality of nodes of a distributed computing environment, wherein the rack awareness information is indicative of hardware configuration information of the plurality of nodes;
determine, based on the rack awareness information, a set of nodes of the plurality of nodes having a non-volatile memory (NVM) capability;
receive, at a management node of the plurality of nodes, a write operation;
select one or more nodes of the set of nodes having the NVM capability to receive at least a portion of the write operation, the one or more nodes being selected based on the NVM capability of the one or more nodes and a higher priority of the one or more nodes than other nodes lacking the NVM capability;
in response to receiving the write operation and selecting the one or more nodes, generate, using the management node, a multicast group associated with the write operation, the multicast group comprising the selected one or more nodes having the NVM capability, wherein the selected one or more nodes are subscribers of the multicast group;
send, to the multicast group, a first request to store, at the one or more nodes having the NVM capability, first data associated with the write operation; and
based on an unavailability of nodes having the NVM capability, send, to one or more different nodes selected to store parity bits associated with the first data, a second request to store the parity bits associated with the first data, the one or more different nodes being selected to store the parity bits based on a lower priority of the one or more different nodes than the one or more nodes of the set of nodes, the lower priority being based on a lack of NVM capability of the one or more different nodes.

15. The system of claim 14, wherein the write operation is a file system block replication operation, and switch parameters are utilized to generate the multicast group associated with the file system block replication operation.

16. The system of claim 15, wherein the write operation is a Reed-Solomon erasure coding operation such that a total number of bits of a given file system block is equal to a first number of data bits plus a second number of parity bits such that the given file system block can be fully recovered from any selection of bits that is greater than or equal to the first number of data bits.

17. The system of claim 14, wherein the plurality of nodes is configured to maintain published messages or streamed data received at one or more node clusters associated with the plurality of nodes.

* * * * *